Nov. 24, 1964 R. K. WILMER 3,158,287
DOCUMENT RETRIEVAL SYSTEM
Filed April 9, 1963 15 Sheets-Sheet 1

INVENTOR
RICHARD K. WILMER
BY
AGENT

Nov. 24, 1964   R. K. WILMER   3,158,287
DOCUMENT RETRIEVAL SYSTEM
Filed April 9, 1963   15 Sheets-Sheet 2
FIG. 2
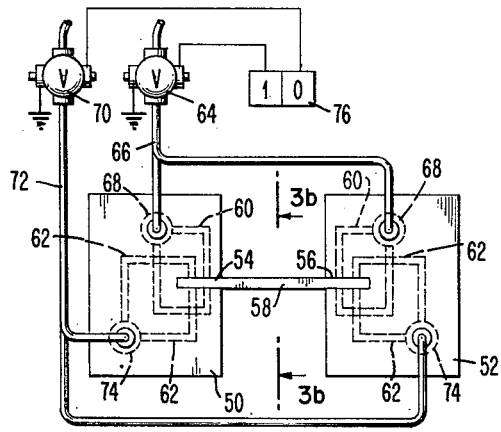
FIG. 3a
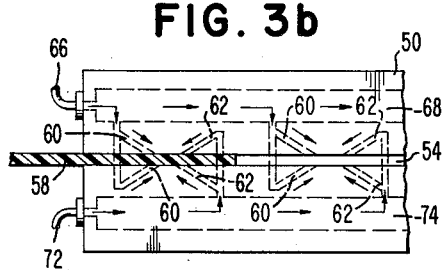
FIG. 3b
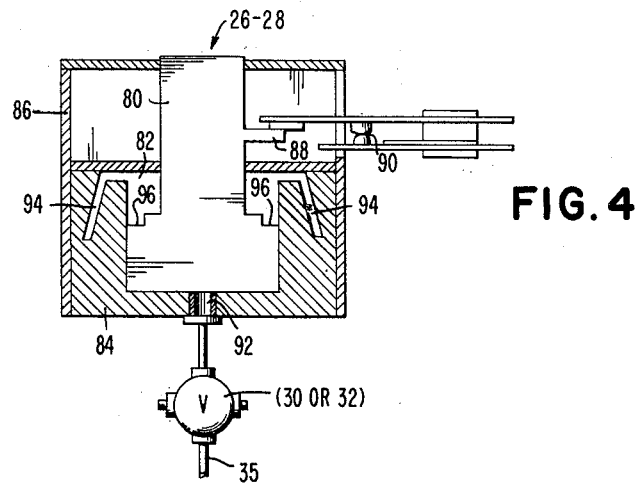
FIG. 4

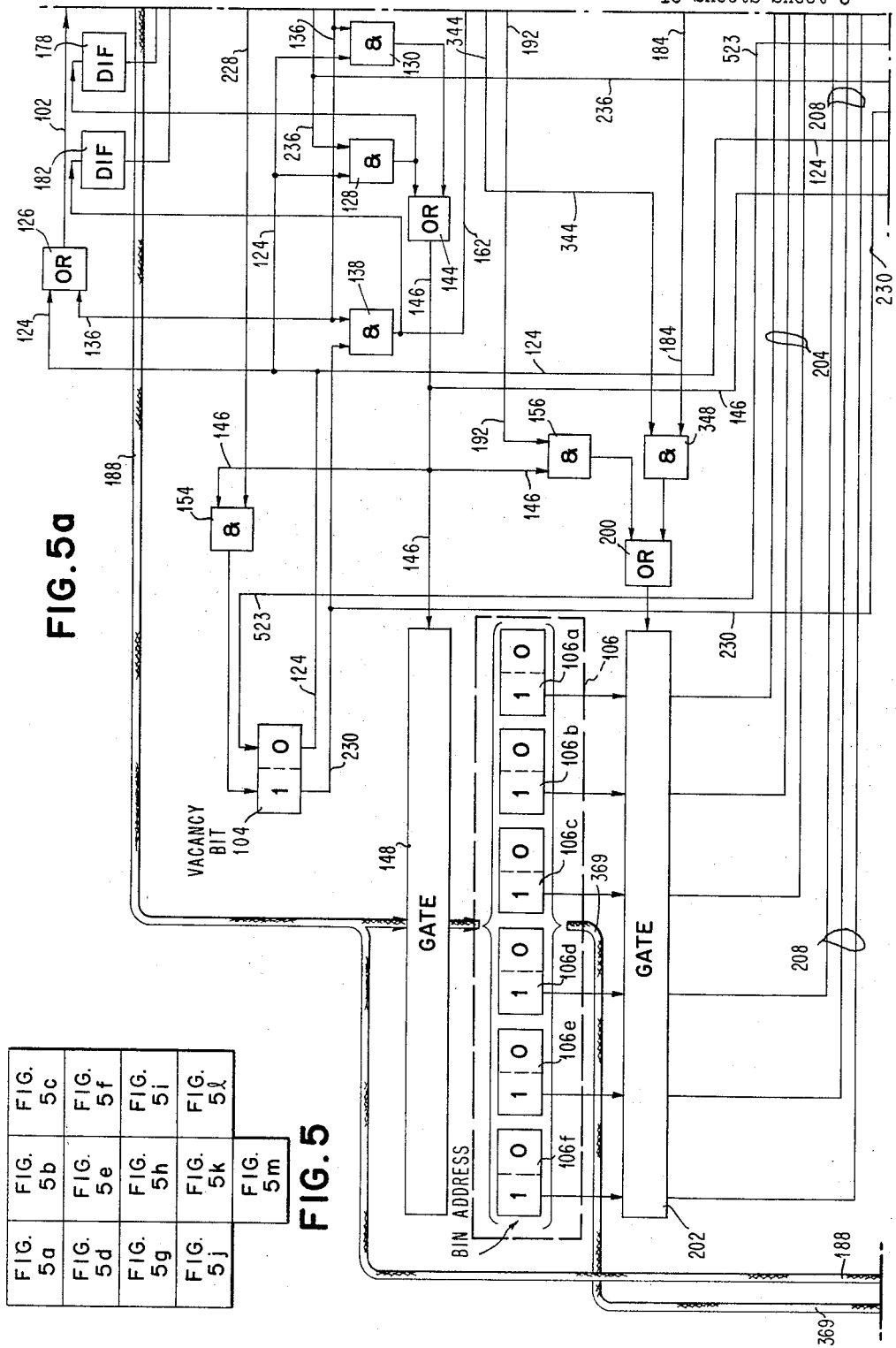

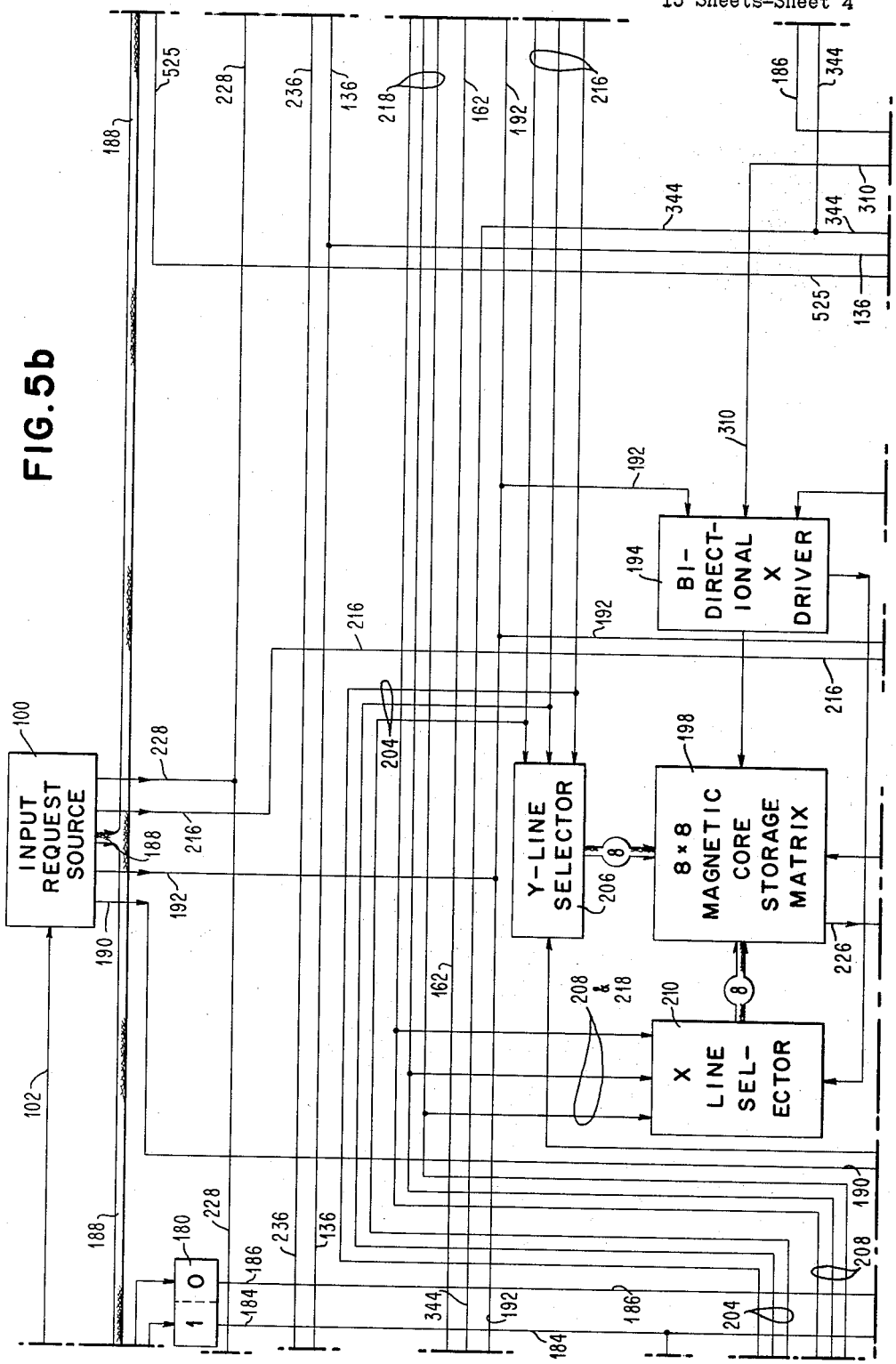

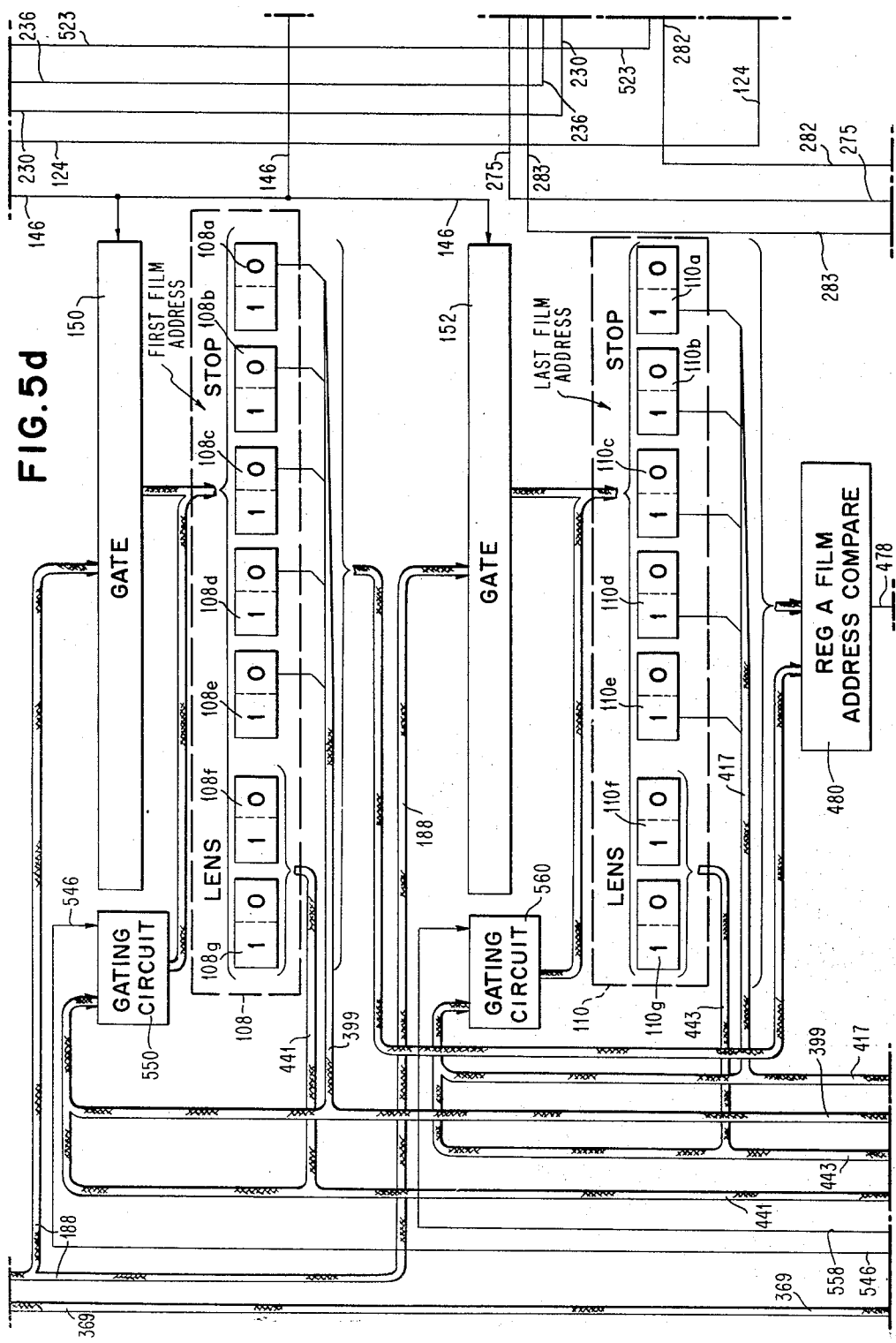

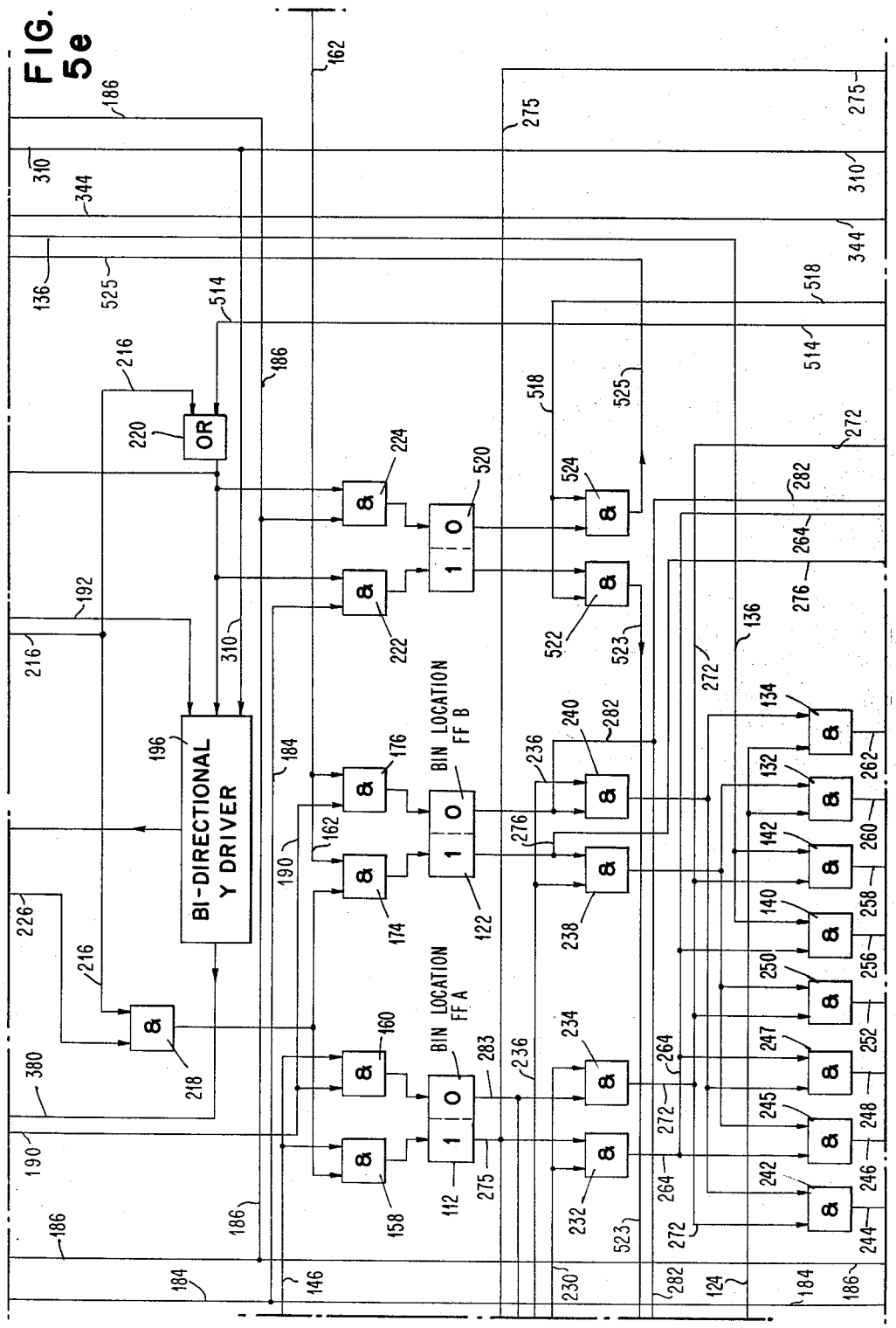

Nov. 24, 1964 R. K. WILMER 3,158,287
DOCUMENT RETRIEVAL SYSTEM
Filed April 9, 1963 15 Sheets-Sheet 8

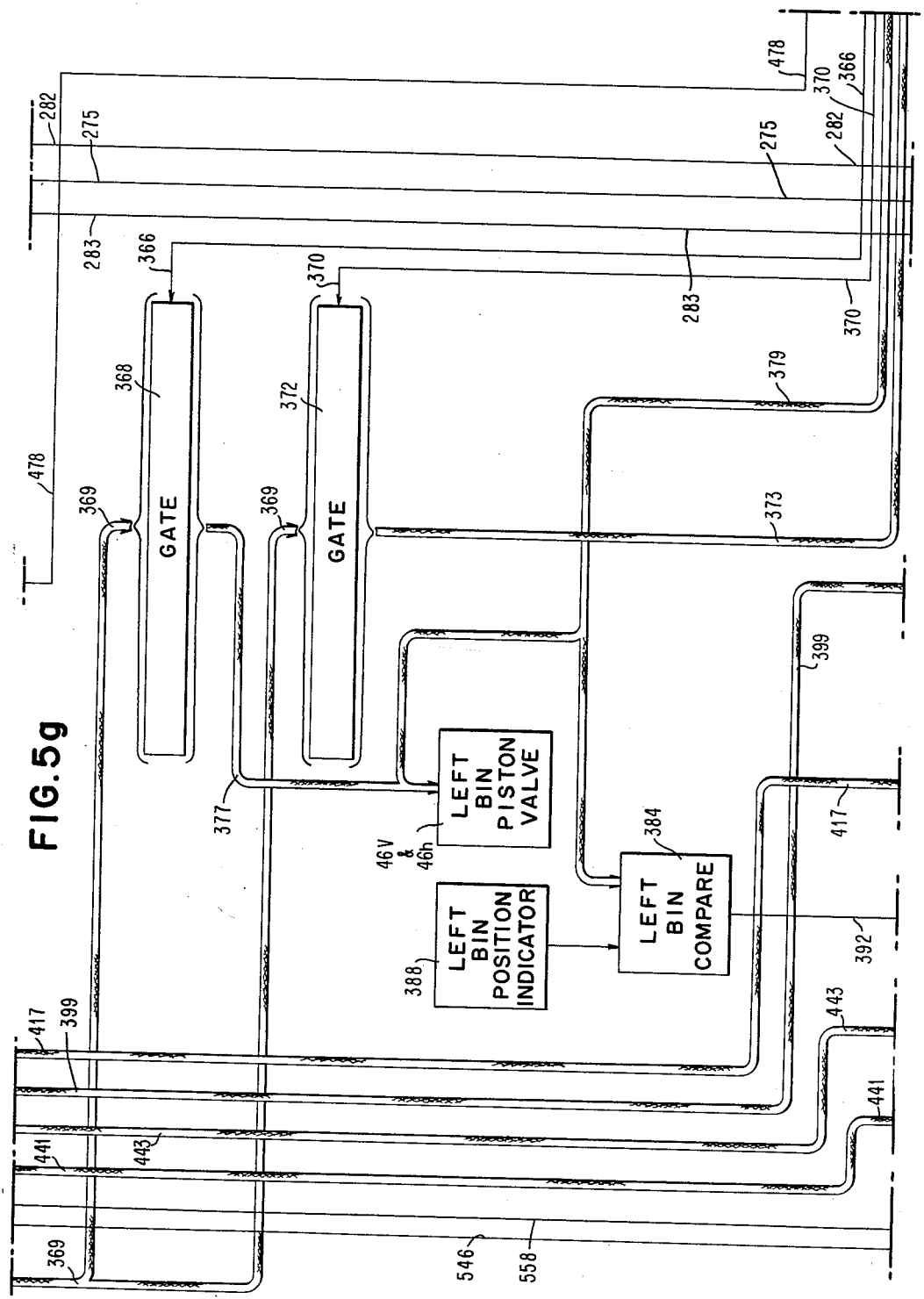

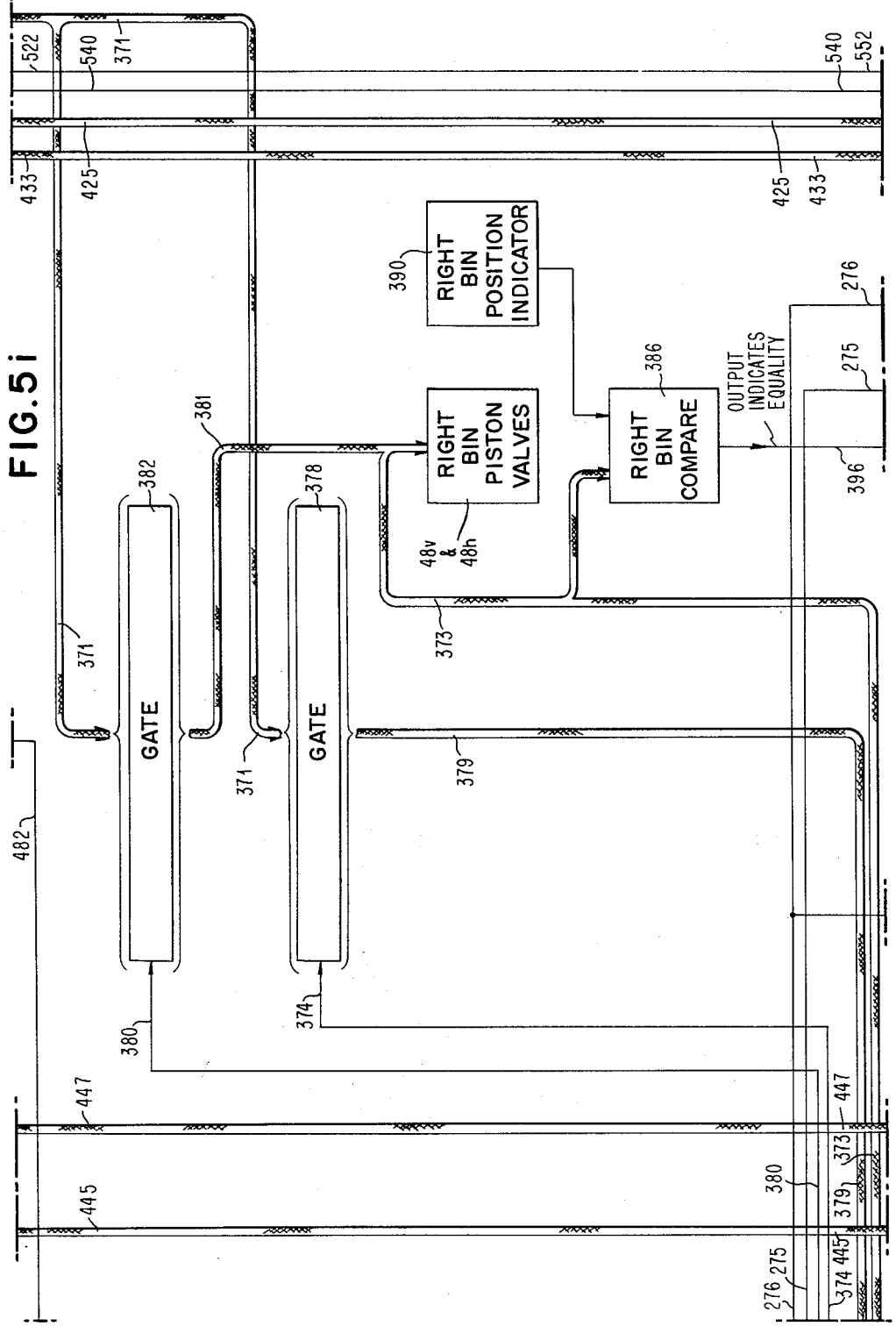

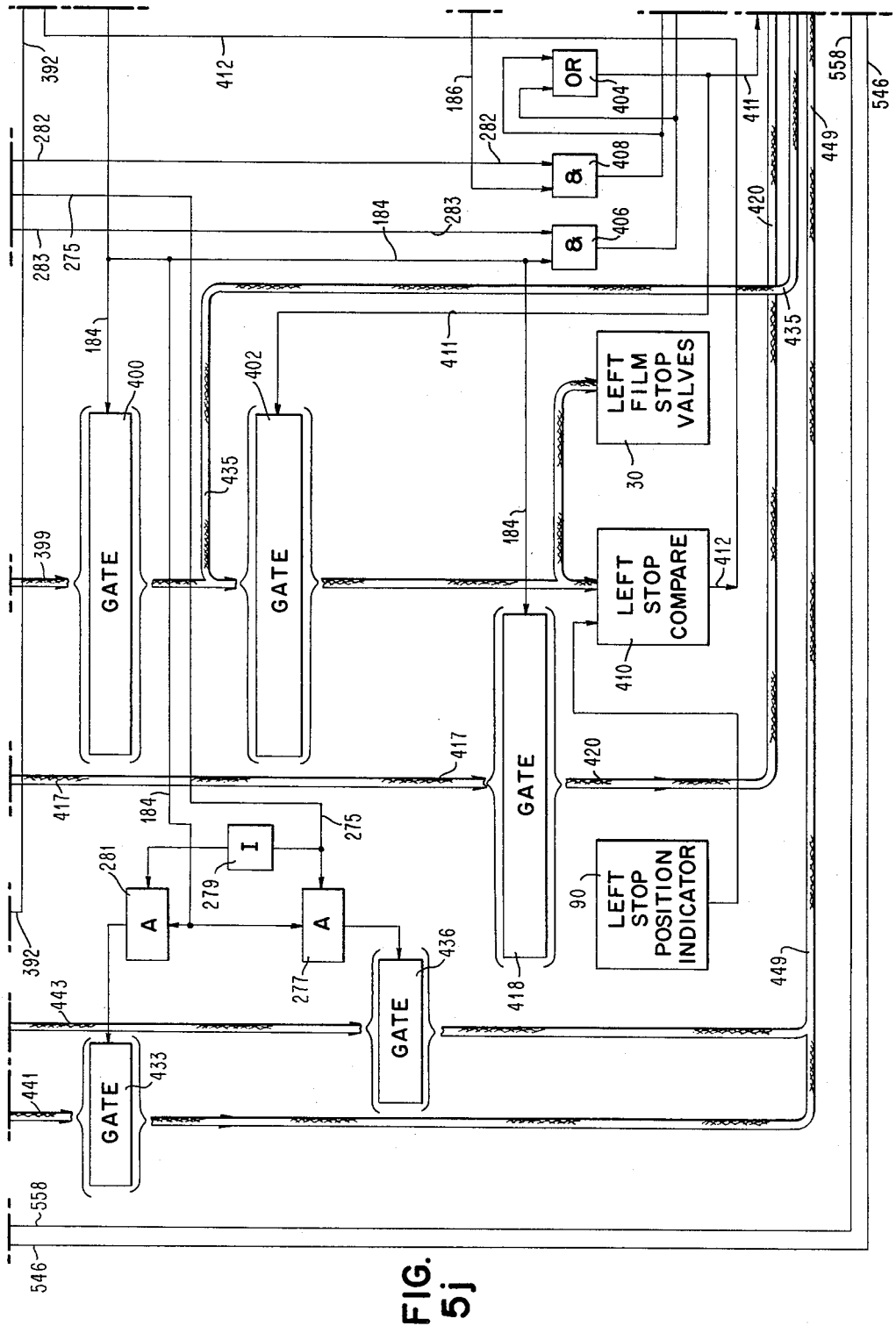

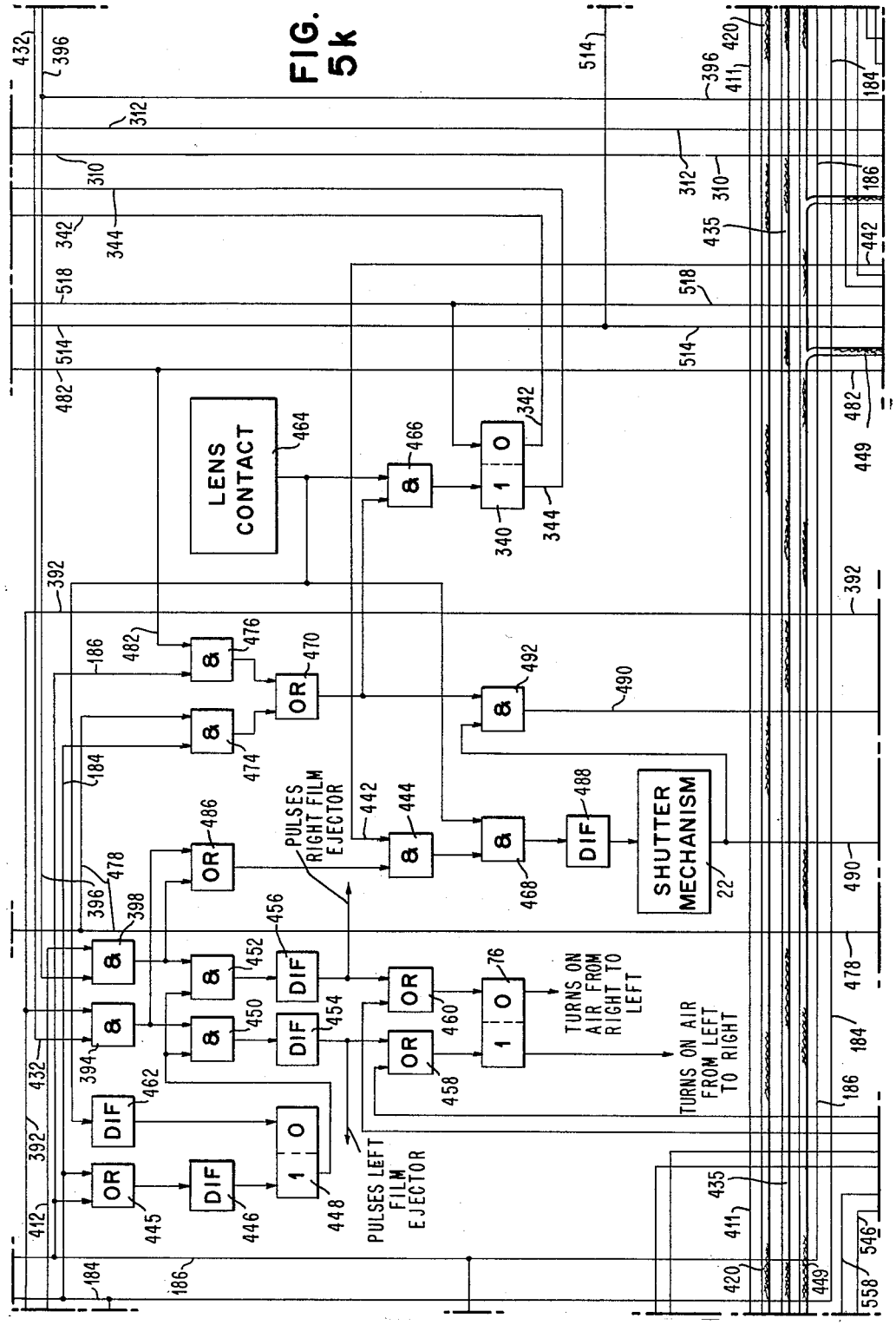

Nov. 24, 1964 R. K. WILMER 3,158,287
DOCUMENT RETRIEVAL SYSTEM
Filed April 9, 1963 15 Sheets-Sheet 14
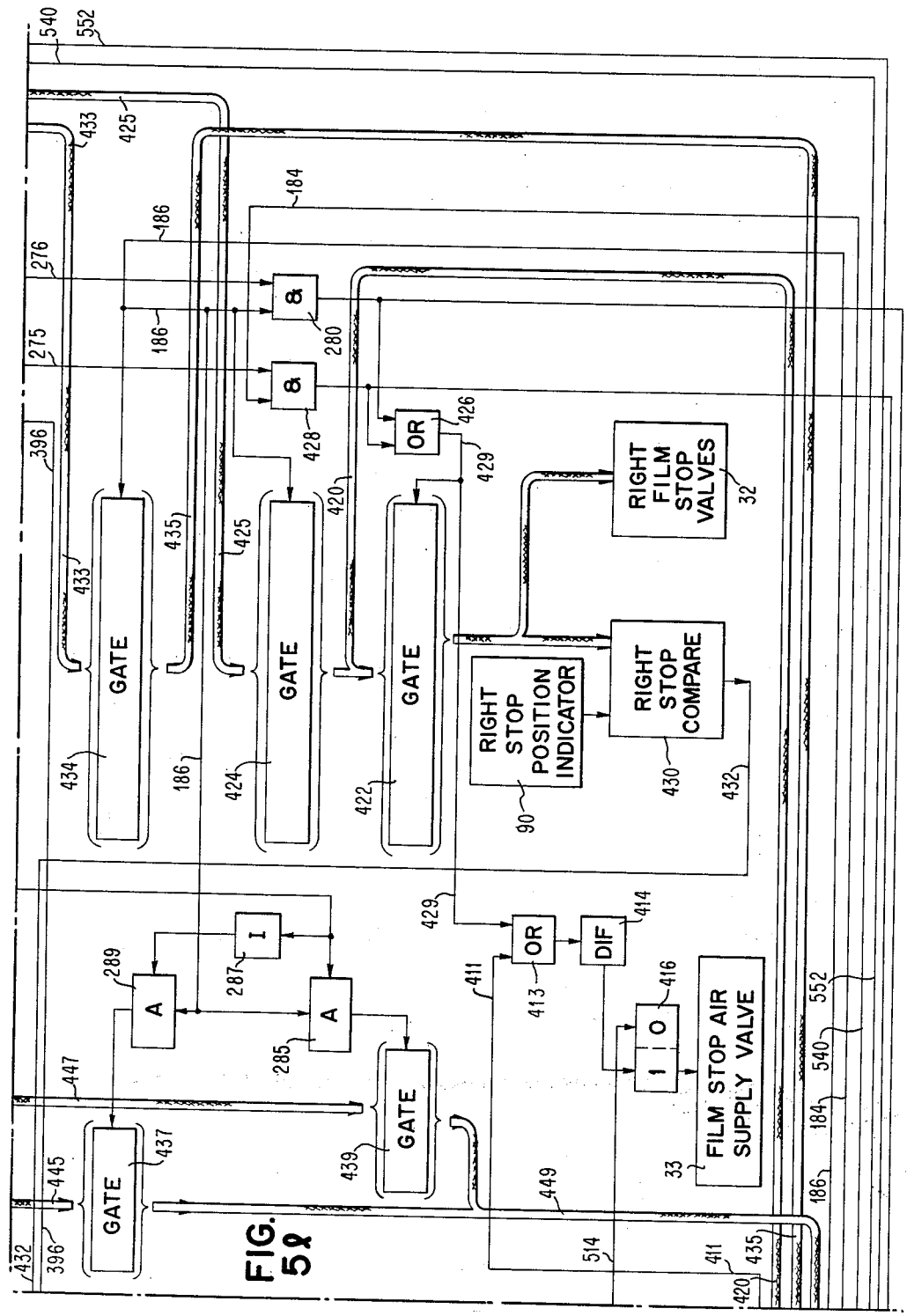

3,158,287
DOCUMENT RETRIEVAL SYSTEM
Richard K. Wilmer, Yorktown Heights, N.Y., assignor to International Business Machines Corporation, New York, N.Y., a corporation of New York
Filed Apr. 9, 1963, Ser. No. 271,316
7 Claims. (Cl. 221—13)

This invention relates to document retrieval systems and more particularly to a system for storing, transporting, and processing documents without manual handling.

With the continual increase in the volume of documents produced by business and government, the storage and retrieval of these documents has become a critical problem. In order to reduce the size of document files, it has become the practice to micro-film the documents for storage purposes. The small size of these document images (hereinafter referred to merely as documents), their number, and the fact that physical contact with the surface on which the documents are stored could destroy it have made manual retrieval of these documents impractical and have greatly complicated the problems of automatic document retrieval. Present automatic document retrieval systems use a mechanical arm and picker mechanism to remove a record containing the desired document from a bin in which it is stored, to carry the record to a utilization station, and to return the record to the bin from which it was withdrawn. Such systems are relatively slow, cumbersome, and expensive.

Pneumatic transport and retrieval systems such as that described in copending application Serial No. 217,185, entitled "Record Transport Device," filed August 15, 1962, on behalf of C. L. Barcia and assigned to the assignee of the instant application have been found to eliminate some of the problems mentioned above. However, the need for improved systems having higher operating speeds (i.e., capable of retrieving and operating upon a larger number of documents per unit time) at low cost with a minimum of manual handling is still a critical one.

A general object of this invention is therefore to provide an improved automatic document retrieval system.

A more specific object of this invention is to provide an automatic document retrieval system which is capable of operating at very high speed.

Another object of this invention is to provide an automatic document retrieval system which requires no manual handling of the stored documents.

A further object of this invention is to provide an automatic document retrieval system where documents may be removed from a storage location for processing in a random order.

A still further object of this invention is to provide an automatic document retrieval system of the type described above which is relatively inexpensive to build and operate.

Still another object of this invention is to provide an automatic document retrieval system of the type described above which is capable of reading a plurality of successive documents from a record once the record has been selected.

In accordance with these objects, this invention provides a first and a second bin, each of which has a plurality of positions formed therein which are capable of receiving a document containing record. For each record, a corresponding position is provided in each of the two bins. Means are provided for indicating in which bin a record is stored and for indicating to the system in which storage position of the indicated bin the desired record is stored. Means are provided for moving the records between each of the bins and a means for utilizing the stored documents. Once it has been determined where the desired record is located, the bin in which the record is stored is positioned by suitable means relative to said moving means. Means are then energized to eject the record from its storage position and to transport it to the utilization device. After the record is ejected from its storage position, the bin in which the next record to be fed to the utilization device is stored is moved to a position in line with the moving means and the other bin is moved to position the storage slot for the utilized record to receive this record. Means are then energized to drive the utilized record from the utilization device to the receiving position in the other bin. Either while this operation is being performed or subsequent thereto, means are energized to drive the next document to be utilized from its storage position to the utilization device.

The foregoing and other objects, features and advantages of the invention will be apparent from the following more particular description of a preferred embodiment of the invention, as illustrated in the accompanying drawings.

In the drawings:

FIG. 2 is an illustration of a film strip for use in the embodiment shown in FIG. 1.

FIG. 3a is a detailed view of the document transports employed in the embodiment of FIG. 1. This view is taken along the line 3a—3a in FIG. 1.

FIG. 3b is a detailed view of the document transports taken along the line 3b—3b in FIG. 3a.

FIG. 4 is a detailed view of one of the record stops employed in the embodiment of FIG. 1.

Figure 1:
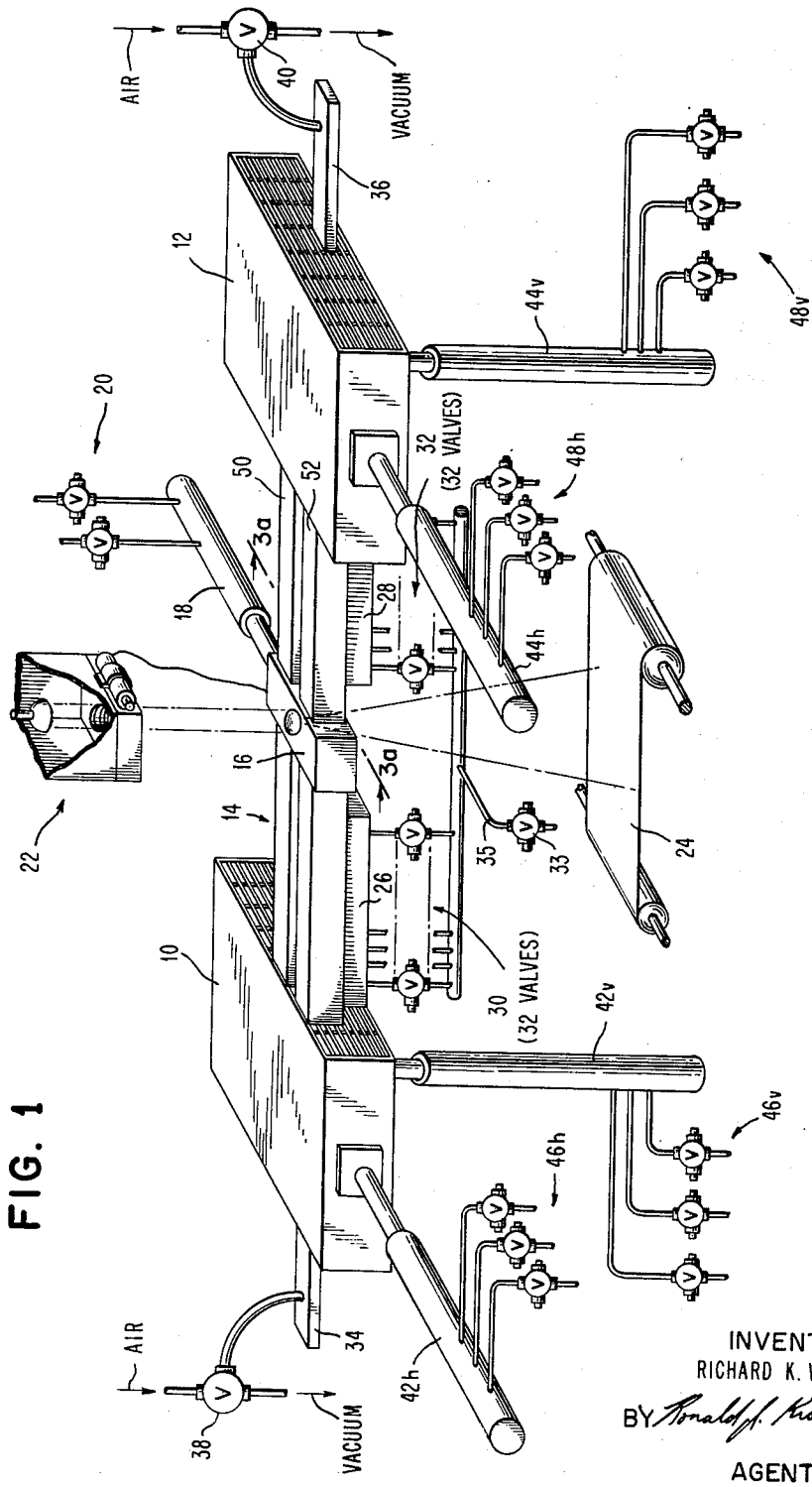
FIG. 1 is a perspective view of a preferred embodiment of an automatic document retrieval system according to the present invention.

FIG. 5 indicates the arrangement of FIGS. 5a–5m to make a composit block diagram of an electronic control circuit suitable for use with the embodiment shown in FIG. 1.

FIGS. 5a–5m when taken together form an electronic control circuit for the embodiment of the invention shown in FIG. 1.

*General Description*

Referring to the perspective view of FIG. 1, the system includes a left-hand storage bin 10 and a right-hand storage bin 12. Each bin has a plurality of record strip receiving positions formed therein, these positions being arranged in a matrix array. In the illustrative embodiment of the invention shown in FIG. 1, each bin has eight rows and eight columns of record storage positions for a total of 64 record storage positions per bin.

A transport path 14 connects bin 10 to bin 12. A suitable transport path is shown in FIGS. 3a and 3b and described in detail later. An optical-read station 16 is positioned in the transport path midway between the two storage bins. This read station has a lens therein. The optical-read station including the lens is moved in the horizontal plane by a piston adder 18 under control of solenoid valves 20. A light source and shutter mechanism 22 is positioned above the optical-read station, and, when the shutter is opened, it shines a beam of light through the lens, and through the document positioned under the lens, to expose output film strip 24. Positioned midway between the two channels of transport path 14 are a bank of left film stops 26 and a bank of right film stops 28. For the film strip shown in FIG. 2, each of these banks requires 32 film stops therein. The left and right film stops 26 and 28, respectively, are raised to an extended position under control of solenoid valves 30 and 32, respectively. Air is supplied to the individual film stop valves 30 and 32 through film stop air supply valve 33 and air tube 35. An individual film stop is shown in FIG. 4 and the operation of these film stops is described in detail later.

Bin 10 has an ejector mechanism 34 positioned behind it in line with transport path 14. An ejector mechanism 36 is similarly positioned behind bin 12. Each of these ejectors is connected through an air hose to a 3-way valve 38 and 40, respectively, which causes either air or vacuum to be applied through the ejector to the rear of the bin.

The positions of transport path 14 and of ejectors 34 and 36 is fixed. Bin 10 is moved relative to these elements in the horizontal plane by piston adder 42$h$ and in the vertical plane by piston adder 42$v$. Bin 12 is moved in the horizontal plane by piston adder 44$h$ and in the vertical plane by piston adder 44$v$. The position of piston adders 42$h$ and 42$v$ is controlled by solenoid valves 46$h$ and 46$v$, respectively, while the position of piston adders 44$h$ and 44$v$ is controlled by solenoid valves 48$h$ and 48$v$, respectively.

The various piston adders shown in FIG. 1 could for example, be of the type shown in FIG. 8 of the beforementioned copending application of C. L. Barcia or of any other standard variety. A suitable mechanism for ejectors 34 and 36 is shown in copending application Serial No. 220,453, filed August 30, 1962, on behalf of H. A. Khoury and C. L. Barcia, entitled "Ejector Device" and assigned to the assignee of the instant application. A detailed description of the operation of these ejector devices is given in this copending application. For the purposes of this invention, it will suffice to state that air pressure applied to the device 34 or 36 draws an aligned record into the transport path 14 and vacuum applied thereto assists in storing a record in its aligned bin.

FIG. 2 shows a typical film strip which may be stored in the bins shown in FIG. 1. The film strip is rectangular in shape and has photographically reduced images of documents stored therein in four columns of 32 documents each. Each vertical group of four documents is referred to as a row. The address of each document is made up of seven binary bits, the first five of which are the row address (and also the number of the film stop which is raised to stop the film strip) and the last two of which are the column address (and also the lens address to read the document). The row and column address are shown in FIG. 2. A suitable border is left on each side of the film strip so that the film strip may be held in position and transported by its edges to prevent defacing the document storage area.

From the above, it can be seen that each film strip contains 128 document images. Since each bin contains 64 of these film strips, each bin may contain 8,192 document images. However, both the bin capacities and the size of the film have been selected merely for illustrative purposes and it is to be understood that, where greater storage capacity is required, larger film strips and/or larger capacity bins may be provided.

Transport Path

FIGS. 3$a$ and 3$b$ form a detailed view of the film transport path 14 mounted between bins 10 and 12 in FIG. 1. The transport includes two rails 50 and 52, each having a guide slot 54 and 56, respectively, formed in its inner side. A film strip 58 fits between rails 50 and 52 with its outer edges within guide slots 54 and 56. The tops and bottoms of guide slots 54 and 56 contain a plurality of air orifices or nozzles 60 and 62 along the length of the slots and directed at angles with respect to the edge surface of the film strip 58. Nozzles 60 are angled to direct the film from left to right in FIGS. 1 and 3$b$ and nozzles 62 are angled to direct the film from right to left. Air is supplied to the nozzles 60 tending to drive the film strip in the rightward direction through solenoid operated valve 64, air tubes 66 and manifolds 68. Air is directed to nozzles 62, tending to drive the film strip in the leftward direction through solenoid valve 70, air tubes 62 and manifolds 74. When flip-flop 76 is in its ONE state, valve 64 is energized while, when flip-flop 76 is in its ZERO state, valve 70 is energized. The control circuitry for flip-flop 76 will be described later.

The Film Stops

FIG. 4 is a detailed view of a single one of the film stops 26 and 28, shown in FIG. 1 as viewed when looking in the direction of travel of a film strip. The stop itself is an inverted T-shaped strip of material 80 which is normally in the position shown in FIG. 4. The horizontal portion of member 80 is in an air tight chamber 82 formed in a casing 84. The entire assembly is enclosed in a cover 86. The vertical flange of member 80 has a projecting arm 88 which, when the member is raised, opens normally-closed contact 90. Member 80 is raised to an extended position with its vertical flange protruding from cover 86 into the path of a transported film strip by applying air pressure to chamber 82 through nozzle 92. There is a nozzle 92 for each of the film stop members 80 and air is supplied to a given nozzle through an individual solenoid operated valve 30 or 32 (FIG. 1). When air pressure is removed from nozzle 92, member 80 returns to the position shown in FIG. 4 under the action of gravity; however, this method of restoring the stops is generally not rapid enough. A positive method of return must therefore be employed. With the configuration of FIG. 4, either of two methods may be used to positively return member 80. With the geometrical configuration of chamber 82, shown in FIG. 4, the air pressure applied to nozzle 92 tends to bleed around the lower portion of member 80 while the member is in its raised position, causing a slight increase in pressure in the chamber arms 94 and in the portion of the chamber above cut out portion 96 of member 80. When air pressure is removed from nozzle 92, the pressure in these portions of chamber 82 above the horizontal part of the member 80, is greater than that below the member and tends to drive it to the retracted position shown in FIG. 4. If a plain chamber is employed rather than the complex configuration of FIG. 4, a source of low pressure air may be applied to the upper portions of all chambers 82, this pressure being sufficient to bias the members to the position shown in FIG. 4, but not being sufficient to hold the member in the downward position against the force of an air jet applied to nozzle 92.

General Operation

This section will deal only with the mechanical operations performed by the hardware shown in FIGS. 1–4. The sections to follow will cover the detailed operation of the device as a whole including the control circuitry shown in FIGS. 5$a$–5$m$.

For the purpose of illustration, assume that the following is the sequence of requests applied to the device:

| Request No. | Bin of Origin | Bin of Destination | Bin Address | First Lens Address | First Stop Address | Last Lens Address | Last Stop Address |
|---|---|---|---|---|---|---|---|
| 1 | Left Hand | Right Hand | 5 | 2 | 8 | 2 | 8 |
| 2 | do | Left Hand | 7 | 0 | 12 | 0 | 12 |
| 3 | Right Hand | do | 24 | 3 | 12 | 3 | 12 |
| 4 | do | Right Hand | 19 | 2 | 12 | 0 | 16 |
| 5 | Left Hand | do | 33 | 3 | 16 | 3 | 16 |

It should be noted that with the address scheme used for the bins and the film strips of this invention, the lowest address is zero, and therefore, for example, lens position No. 2 is actually the third lens position rather than the second.

Since the first document is to be taken from left hand bin 10, the valves 46$h$ and 46$v$ are energized to apply air pressure to piston adders 42$h$ and 42$v$. Assume that the zero position in bin 10 is the slot in the upper right hand corner thereof and that address 1, 2, 3, etc., are the successive slots thereunder. The address 8 is the slot directly to the left of the ZERO slot. This being the case, for bin address 5 to be positioned between ejector 34 and transport path 14, only valves 46$v$ would be energized to cause piston adder 42$v$ to be incremented five positions.

At the same time that bin 10 is being positioned, signals are applied to energize valve 33 and to energize the valves 32 corresponding to the film stop No. 8 of the film stops 28 and to all of the film stops 28 behind this one. The reason for raising all the film stops behind the desired one will be apparent later. Finally, valves 20 are energized causing piston adder 18 to move optical-read station 16 to position the lens therein at lens position No. 2 (to position the lens over column No. 2, the third column, of a film strip).

When the above operations have been completed, three-way valve 38 is momentarily transferred to cause air pressure to be applied to ejector 34. At the same time that a signal is applied to three-way valve 38, a signal is also applied to flip-flop 76 (FIG. 3a) to switch this flip-flop to its ONE state. This energizes valve 64 causing air pressure to be applied through this valve and through air channel 66 and manifold 68 to angled nozzles 60 tending to drive a film strip from left to right in transport path 14. The pulsing of ejector 34 causes the selected film strip to be blasted out of bin 10 into transport path 14. The viscous drag effect of the air flowing through nozzles 60 on the surface of the film strip causes the film strip to continue moving through the transport path until it is stopped by one of the stops 28. When the proper positioning of the film strip at optical-read station 16 is detected, a signal is applied to shutter-controlled light source 22, causing the shutter to be momentarily opened to reproduce the desired document on output film 24.

The proper positioning of the various elements may either be detected by suitable detectors (not shown in FIG. 1, but shown in FIGS. 5a–5m and described later) or the signals which are generated when these elements are suitably positioned may merely be timing pulses which are timed to occur a sufficient period of time after the positioning operation is started to allow the positioning to be completed.

The signal which is generated when the film strip is properly positioned at the optical-read station, in addition to being applied to shutter mechanism 22 is also applied to control circuitry to cause the bin of origin for the next requested document and the bin of destination for the document now being read to be properly positioned. The bin of destination for the document presently being read will always be the opposite bin from the bin of origin for the next document to be read. In the illustrative example, the second document has as its bin of origin the left hand bin; therefore, the film strip containing the first requested document is returned to right hand bin 12. Control signals are therefore applied to valves 46h and 46v to position bin address 7 of bin 10 in line with ejector 34 and transport path 14 and to position bin address 5 of bin 12 in line with transport path 14.

The shutter of shutter mechanism 22 has a contact attached thereto which, when it is closed, causes a signal to be applied to flip-flop 76 (FIG. 3a) to cause the proper valve 64 or 70 to be energized to cause air to flow through the nozzles 60 or 62 which would tend to drive the film strip containing the document which was just read to its bin of destination. In this case, flip-flop 76 is left in its ONE state. When the bin 12 has been properly positioned, to receive the utilized film strip and flip-flop 76 has been switched to the proper state, energy is removed from valve 33 causing film stops 28 to be returned to their retracted position. This allows the viscous drag effect of the air flowing through nozzles 60 on the surfaces of the film strip containing requested document No. 1 to drive this film strip into bin address 5 of bin 12.

At this time bin 10 should be properly positioned to feed the film strip containing the second requested document into transport path 14. If the control mechanism for stops 28 could be made fast enough to be retracted to allow the utilized film strip to be returned to bin 12 and then be immediately raised again, to stop the document being fed from bin 10 at its proper position, the returning of the used film strip and the ejecting of the new film strip could be accomplished simultaneously. However, the control circuitry for accomplishing this sort of operation is rather complex and to simplify the circuit, the control circuitry shown in FIGS. 5a–5m permits a short timing lag between these two operations. Therefore, immediately after the return of the film strip containing the first requested document to bin 12, signals are applied to valve 33 and the proper ones of valves 32 to cause the desired film stops 28 to be raised to their extended position. Signals are also applied to valves 20 to cause the lens of optical-read station 16 to be positioned over the proper column to read the second requested document.

When these positioning operations have been satisfactorily completed, a signal is again applied to flip-flop 76 to switch it to its ONE state and to valve 38 to cause air to be momentarily applied through it to ejector 34.

Referring to the above chart, it is seen that the third requested document is taken from right hand bin 12. Therefore, the film strip containing the second requested document is returned to left hand bin 10, the bin from which it was taken. This being true, when the film strip containing requested document No. 2 closes the lens contact, signals are applied to valves 46h and 46v to cause left hand bin 10 to be positioned to receive the second requested document, and signals are applied to valves 48h and 48v to cause bin 12 to be positioned with its storage position No. 24 in line with ejector 36 and transport path 14. It is noted that, since the film strip containing the second requested document was originally taken from bin 10, this bin should be properly positioned at this time and that the application of signals to valves 46h and 46v should not be necessary. However, these signals are applied to the valves as an added precaution.

When the contact attached to the shutter in shutter mechanism 22 is closed, a signal is applied to flip-flop 76 (FIG. 3a) to switch this flip-flop to its ZERO state. This conditions valve 70 causing air to be applied through this valve and through lines 72 and manifold 74 to nozzles 62, tending to drive a film strip from right to left in transport path 14. The viscous drag effect of the air flowing through nozzles 62 on the surfaces of film strip 58 drive the film strip containing requested document No. 2 back into bin address 7 of left hand bin 10. It is noted that since the direction of travel of this film strip has been reversed, the film stops 28 do not present the film strip from being returned to bin 10 when the direction of air flow in transport path 14 is reversed. To avoid the premature return of the film strip to bin 10, the detailed embodiment of the invention shown in FIGS. 5a–5m delays the switching of flip-flop 76 until an indication is received that bin 10 has been properly positioned to receive the film strip. Current is then removed from valve 33 to allow film stops 28 to return to their retracted position.

Since the film strip containing the third requested document is being taken from right hand bin 12, signals are now applied to valve 33 and to the valves 30 corresponding to the 12th film stop 26 and all those behind it. Current is also applied to valves 20 to cause the lens in optical-read station 16 to be positioned over column 3, the last column of the film strip.

When all elements are properly positioned, a signal is applied to flip-flop 76 to switch this flip-flop to its ZERO state, causing air to flow through nozzles 62 of transport path 14 and to three-way valve 40 to cause air pressure to be momentarily applied to ejector 36.

Since the film strip containing the fourth requested documents is also to be taken from the right hand bin, the film strip containing the third requested document is returned to the left hand bin in a manner similar to that described with reference to the returning of the film strip containing the first requested document to the right hand bin, and right bin 12 is positioned to align bin address 19 thereof, the bin address containing the film strip on which requested documents No. 4 appear, with ejector 36 and transport path 14.

Referring back to the chart, it is seen that three successive documents are taken from the film strip about to be ejected. This however, does not alter the initial operations of the device. After the film strip containing requested document No. 3 is returned to bin 10, signals are applied to energize valve 33 and the valves 30 corresponding to stop No. 12 of the film stops 26 and all those behind it. Signals are also applied to valves 20 to cause the lens of optical-read station 16 to be positioned over column No. 2 of the film strip. When these operations have been completed, signals are applied to the ZERO side input of flip-flop 76, causing air to flow in nozzles 62 of transport path 14, and to valve 40 causing air pressure to be momentarily applied to ejector 36. This causes the desired film strip to be ejected into transport path 14 and along transport path 14 to a position with the first requested document under the lens in optical-read station 16. The sensing of this condition by the lens contact causes the shutter of shutter mechanism 22 to be opened allowing an image of the first of the requested documents to be reproduced on an output film 24.

The closing of the shutter contact in shutter mechanism 22 now causes a new film address to be applied to the device-control circuitry. This is the film address 15. It can be seen by looking at the film strip shown in FIG. 2 that the stop address remains the same for film addresses 14 and 15 and only the lens address changes. Therefore, this new address does not alter the settings of film stops 26, but is applied to valves 20 to cause piston adder 18 to move the lens in optical-read station 16 from its position over column No. 2 of the film strip to a position over column No. 3. When the lens is properly positioned, a signal is applied to shutter mechanism 22 to cause the second of the requested documents No. 4 to be reproduced on film strip 24 and to cause the address in the device-control circuitry to again be incremented one position.

Again referring to FIG. 2, it is seen that in going from document No. 15 to document No. 16 on a film strip, both the lens address and the top address are changed. The application of the new stop address through valves 30 causes the front-most film stop 26 to have air removed from its nozzle 92 (see FIG. 4) allowing this stop member 80 to return to its retracted position. The viscous drag effect of the air pressure flowing through nozzles 62 on the surfaces of the film strip increments the film strip forward to the next raised film stop, the film stop having the address 16. Signals are also applied to valves 20 to cause piston adder 18 to return to its fully retracted position thereby positioning the lens in optical-read station 16 over the ZERO column of the film strip.

When these positioning operations have been completed, shutter mechanism 22 is again energized causing the last of the requested documents No. 4 to be reproduced on film strip 24 and causing the shutter contact to be closed.

Since all the requested documents on the film strip have now been read out, the closing of the shutter contact now causes a signal to be applied to flip-flop 76 to switch this flip-flop to its ONE state. This causes air to flow in nozzles 60 (see FIG. 3) of transport path 14 to drive the film strip into the bin address 19 of previously-positioned right hand bin 12. This film strip is returned to right hand bin 12 so that left hand bin 10 may be properly positioned to eject the film strip containing requested document No. 5 which is stored therein.

It should be noted that a film strip cannot be turned around in the system. In the discussion so far, it has been assumed that the film strips are stored with the lower numbered rows to the left and the higher numbered ones to the right. Therefore, when the film strip containing requested documents No. 4 was fed from the right hand bin up against right film stops 26, it was the lowest numbered document which was read first, and the front-most film stop was dropped to allow a higher numbered document to be read. However, for this same procedure to be followed when a document is fed from the left hand bin 10 up against film stops 28, it is the highest order document which must be read first, so that a film stop may be dropped to allow the reading of a document contained in a lower numbered row. This is true since it is the end of the film strip adjacent to the highest numbered row which abutts right film stops 28.

*Control Circuitry*

Figure 5C:
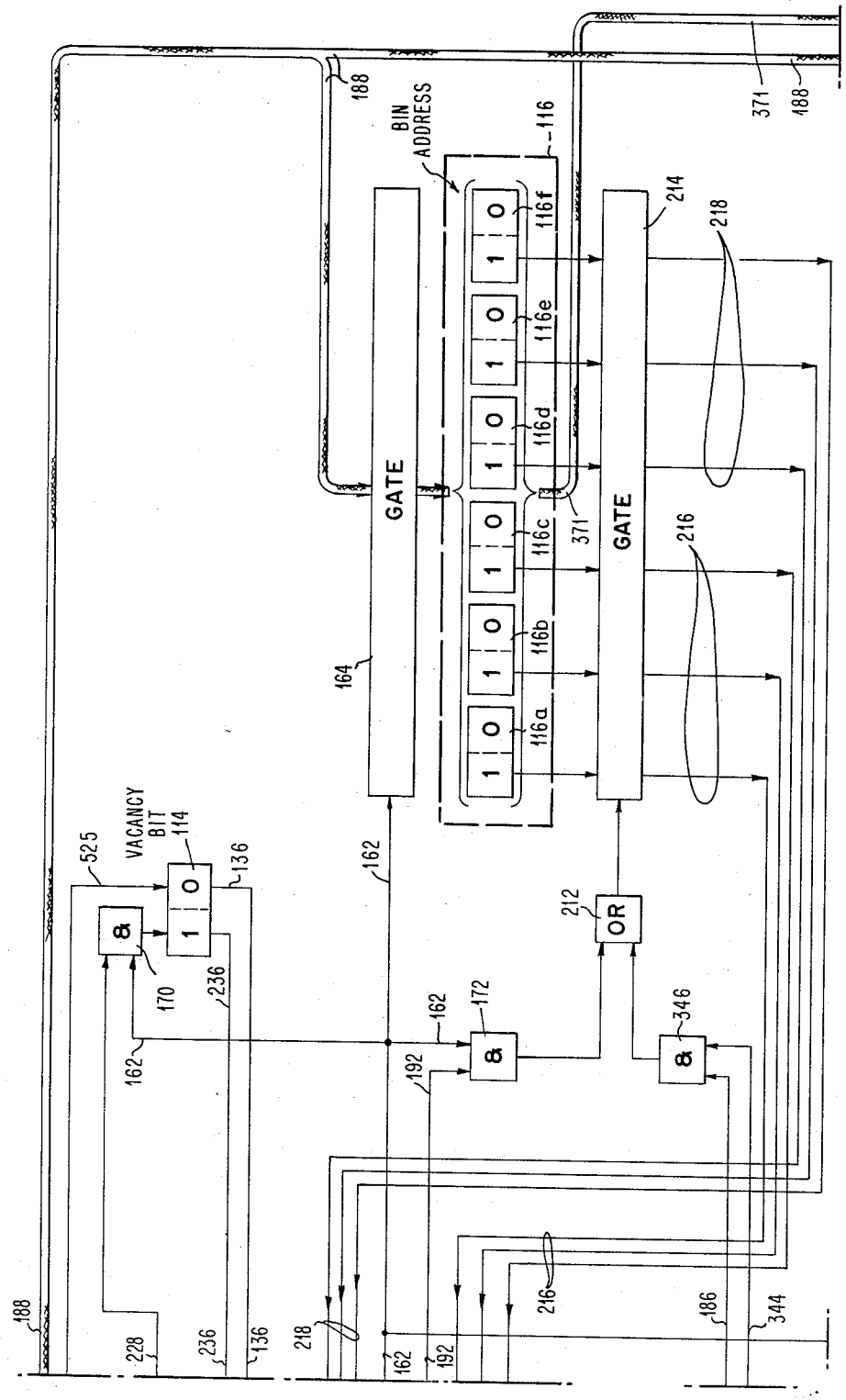

FIGS. 5a–5m form a detailed schematic diagram of a control circuit for the device shown in FIG. 1. Information as to the location of a desired document is supplied by input request source 100 (FIG. 5b). Source 100 may, for example, be a card reader or an incremental punched tape or magnetic tape reader, or a manual keyboard operated either alone or in combination with any of the other sources indicated above. The only limitation on source 100 is that it be capable of generating a given amount of information in response to a signal on line 102, and of then not generating any more information until another signal appears on line 102. In FIG. 5b, input source 100 has also been shown as generating a plurality of timing pulses. If the particular input source used is not capable of generating such timing pulses, block 100 may be considered as also including a timing pulse generator, the cycling of which is also controlled by the signals on line 102.

The circuit operates under control of two registers hereinafter referred to as the A and the B registers. The A register consists of vacancy bit flip-flop 104 (FIG. 5a), six-bin address flip-flops 106a–106f, seven first-film-address flip-flops 108a–108g (FIG. 5d), seven last-film-address flip-flops 110a–110g, and bin location flip-flop 112 (FIG. 5e). First-film-address flip-flops 108a–108e and last-film-address flip-flops 110a–110e supply the addresses of the film stops 26 or 28 (FIG. 1) while first-film-address flip-flops 108f–108g and last-film-address flip-flops 110f–110g supply the lens position address. The B register consists of vacancy bit flip-flop 114 (FIG. 5c), six-bin address flip-flops 116a–116f, seven first-film-address flip-flops 118a–118f (FIG. 5f), seven last-film-address flip-flops 120a–120f and a bin location flip-flop 122 (FIG. 5e). Again, first-film-address flip-flops 118a–118e and last-film-address flip-flops 120a–120e supply the address of the film stops while first-film address flip-flops 118f–118g and last-film-address flip-flops 120f–120g supply the lens position address. All the register A and register B flip-flops and all other flip-flops in the circuit are of the type which are switched to their ONE state by a signal applied to their ONE-side input, to their ZERO state by a signal applied to their ZERO side input, and which generate a steady D.-C. output from the side they are switched to.

The output line 124 from the ZERO side of register A vacancy bit flip-flop 104 (FIG. 5a), is applied as one input to OR gate 126, and as one input to AND gates 128 and 130. As will be seen later, the signal on line 124 is also applied as one input to AND gates 132 and 134 (FIG. 5e). The output from the ZERO side of register B vacancy bit flip-flop 114 (FIG. 5c), is applied through line 136 as the other input to OR gate 126 (FIG. 5a), is the other input to AND gate 130, as one input to AND gate 138, and as one input to AND gates 140 and 142 (FIG. 5e). The output from OR gate 126 is the input line 102 to input request source 100 (FIG. 5b).

The outputs from AND gates 128 and 130 (FIG. 5a) are applied through OR gate 144 and line 146 as a conditioning input to gates 148, 150 (FIG. 5d) and 152 and as one input to AND gates 154, 156, 158 (FIG. 5e) and 160. The output from AND gate 138 is applied through line 162 as the conditioning input to gates 164, (FIG. 5c), 166 (FIG. 5f) and 168 and as one input to AND gates 170, 172, 174 and 176 (FIG. 5e).

The output from AND gate 128 is also applied through differentiator 176 (FIG. 5a) to the ZERO-side input of primary control flip-flop 180. The output from AND gate 138 is applied through differentiator 182 to the ONE-side input of flip-flop 180. When primary control flip-flop 180 is in its ONE state, an output signal appears on line 184 indicating that the circuit is under primary control of register A. When flip-flop 180 is in its ZERO state, an output signal appears on line 186 indicating that the circuit is under primary control of the B register. The uses to which the signals on lines 184 and 186 are put will be apparent later.

If input request source 100 is not already in an output cycle, a signal applied to line 102 by OR gate 126 causes information as to the bin and film addresses of the desired documents to be applied to cable 188. This cable applies the bin address information through gate 148 (FIG. 5a) to bin address flip-flops 106a–106f of register A and through gate 164 (FIG. 5c) to bin address flip-flops 116a–116f of register B. This line also supplies the film address of the lowest-numbered document on the film to be read through gate 150 to first-film-address flip-flops 108a–108g of register A and through gate 166 to first-film-address flip-flops 118a–118g of register B. Line 188 also supplies the film address of the highest-numbered document sought through gate 152 to last-film-address flip-flops 110a–110f of register A and through gate 168 to last-film-address flip-flops 120a–120g of register B. Where only one document is requested from a selected film strip, the information applied to the first and last film addresses flip-flop will be the same.

Information may be applied to the lines 188 either serially or in parallel. A short time after the application of input information to lines 188 has been completed, input request source 100 applies a timing pulse to line 190. This timing pulse is applied as the other input to AND gates 160 (FIG. 5e) and 176. The output from AND gate 160 is applied to set register A bin location flip-flop 112 to its ZERO state and the output from AND gate 176 is applied to set register B bin location flip-flop 122 to its ZERO state.

A short time after the application of the signal to line 190, input request source 100 applies a timing pulse to line 192, which signal is applied as the other input to AND gates 156 (FIG. 5a) and 172 (FIG. 5c). The signal on line 192 is also applied to bi-directional X driver 194 (FIG. 5b) and bi-directional Y driver 196, (FIG. 5e). Each of these drivers is capable of applying a half-select signal of either polarity to magnetic core storage matrix 198. Magnetic core storage matrix 198 is an 8 by 8 array, having one core corresponding to each bin address. If the core corresponding to a particular bin address is in the ONE state, this indicates that the film strip stored at that bin address is in the left bin 10 (see FIG. 1) whereas if the core is in its ZERO state, this indicates that the document is in right hand bin 12. The signal applied to drivers 194 and 196 by line 192 sets these drivers so that when an energizing signal is subsequently applied to them, they will supply drive signals of a polarity tending to drive a core from its ONE state to its ZERO state.

The output from AND gate 156 (FIG. 5a) is applied through OR gate 200 to condition gates 202 to pass the three lower order bits stored in bin address flip-flops 106a–106c over lines 204 to Y line selector 206 (FIG. 5b) and to pass the three bits stored in bin address flip-flops 106d–106f through lines 208 to Y line selector 210. The output from AND gate 172 (FIG. 5c) is applied through OR gate 212 to condition gates 214 to pass the information stored in bin address flip-flops 116a–116c over lines 216 to Y line selector 206 and to pass the information stored in bin address flip-flops 116d–116f over lines 218 to X line selector 210. Y line selector 206 and X line selector 210 are decoder devices which convert the binary information of one of three input lines into a closed circuit through one of eight lines. These decoders, could for example, be a conventional relay tree or other suitable device. The signal on line 192 therefore serves to set the bi-directional drivers 194 and 196 to apply a pulse of a proper polarity to the storage matrix 198 and also sets the line selectors 206 and 210 to cause the subsequently applied drive signal to pass through the proper row and column in the storage matrix.

A short time after the application of the signal to line 192, input request source 100 applies a timing pulse to line 216. This signal is applied to condition AND gate 218 (FIG. 5e) and is also applied through OR gate 220 to trigger X driver 194 and Y driver 196, causing two half-select signals to be applied to the core corresponding to the bin address in the bin address register being used to have a full select pulse applied to it. The output from OR gate 220 is also applied to AND gates 222 and 224, one of which will be conditioned at this time by a signal on line 184 or 186. However, the output from the fully conditioned one of these AND gates has no significance at this time. If the core having a full select current applied to it is in its ONE state, an output signal appears on sense line 226. This signal is applied through conditioned AND gate 218 to AND gates 158 and 174. At this time, one of these AND gates is conditioned by a signal on either line 146 or 162, respectively. The output from AND gate 158 is applied to the ONE-side input of register A bin location flip-flop 112 while the output from AND gate 174 is applied to the ONE-side input of register B bin location flip-flop 122. The setting of either of the bin location flip-flops of the ONE state indicates that the document indicated by the associated register is located in left bin 10 (FIG. 1).

A short time after the application of the timing pulse to line 216, input request 100 applies a timing pulse to line 228. This signal is applied as the other input to AND gates 154 (FIG. 5a) and 170 (FIG. 5c). The output from AND gate 154 is applied to the ONE-side input of register A vacancy bit flip-flop 104 while the output from AND gate 170 is applied to the ONE-side input of register B vacancy bit flip-flop 114. The output from the ONE side of a register A vacancy bit flip-flop 104 is applied by line 230 as the second input to AND gate 138 and is applied as one input to AND gates 232 (FIG. 5e) and 234. The output from the one side of register B vacancy bit flip-flop 114 is applied through line 236 as the other input to AND gate 128 and as one input to AND gates 238 and 240.

At this time, one cycle of input request source 100 has been completed and, if one of the registers is available to receive data, this being indicated by the vacancy bit flip-flop of that register being in its ZERO state, OR gate 126 (FIG. 5a) will apply a signal to line 102 causing a new cycle of input request source 100 to commence. While this is going on, the document indicated by the previous request is selected by hardware to be described now.

The bin location of the documents indicated in registers A and B is indicated by an output from one of eight AND gates as follows: If AND gate 242 (FIG. 5e) has an output on line 244, this indicates that the document indicated by register A and the document indicated by register B are both in right bin 12 (see FIG. 1). If AND gate 245 has an output signal on line 246, this indicates that the document indicated in register A and the document indicated in register B are both in the left bin 10 (see FIG. 1). If AND gate 247 has an output on line 248, this indicates that the document indicated by register A is in the left bin and the document indicated by register B is in the right bin. If AND gate 250 has an output on line 252, this indicates that the document indicated by the A register is in the right bin and that indicated by the B register is in the left bin. If AND gate 140 has an output on line 256, this indicates that the document indicated in the A register is in the left bin and there is nothing in the B register. If AND gate 142 has an output on line 258, this indicates that the document indicated in the A register is in the right bin and there is nothing in the B register. If AND gate 132 has an output on line 260, this indicates that the document indicated in the B register is in the left bin and there is nothing in the A register. If AND gate 134 has an output on line 262, this indicates that the document indicated in the B register is in the right bin and there is nothing in the A register.

The output from AND gate 232 (FIG. 5e) is applied through line 264 as one input to AND gates 245, 247, and 140 and through line 264 and normally-open contact 266D (FIG. 5h) of relay 266 as one input to AND gate 278. The signal on line 264 is also passed through normally-closed contact 266F of relay 266 to form one input to AND gate 270. The signal on line 264 also is passed through normally-open contact 266D to form one input to AND gate 278. The output from AND gate 234 is applied through line 272 as one input to AND gates 242, and 250 and 142, and through line 272 and the normally-open contact 266C of relay 266 to AND gate 268. The signal on line 272 is also applied through normally-closed contact 266E of relay 266 to form one input to AND gate 274. The output from AND gate 238 is applied as one input to AND gates 245, 250 and 132. The output from AND gate 240 is applied as one input to AND gates 242, 247 and 134.

The output from the ONE side of register A bin location flip-flop 112 (FIG. 5e) is also applied through line 275 as one input to AND gate 277 (FIG. 5j) and through inverter 279 as one input to AND gate 281. The signal on line 275 is also applied as one input to AND gate 428 (FIG. 5l). The output from the ZERO side of flip-flop 112 is applied through line 283 as one input to AND gate 406 (FIG. 5j). The output from the ONE side of register B bin location flip-flop 122 in addition to being applied to AND gate 238 is also applied to line 276. This line feeds (a) through normally-open contact 266F (FIG. 5h) to form one input to AND gate 270; (b) put to AND gate 278; (c) to one input of AND gate 289 (FIG. 5l); (d) as one input to AND gate 285; and (e) through inverter 287, as one input to AND gate 289. The output from the ZERO side of register B bin location flip-flop 122 is applied through line 282 and (a) through normally-open contact 266E to form one input to AND gate 274; (b) through normally-closed contact 266C to form one input to AND gate 268; and (c) to one input of AND gate 405 (FIG. 5j).

The second input to AND gates 270 (FIG. 5h) and 274 is the line 184 indicating that the circuit is under primary control of register A. The second input to AND gates 268 and 278 is the line 186 indicating that the circuit is under primary control of register B. The outputs from AND gates 270 and 278 are applied to the ONE-side input of a bin-of-origin flip-flop 284. The output from AND gates 268 and 274 is applied to the ZERO-side input of flip-flop 284. When flip-flop 284 is in its ONE state, an output signal appears on line 286 (also called the BOR-L line) indicating that the document now being operated upon has as its bin-of-origin left bin 10 (FIG. 1). Conversely, a signal on output line 288 (also called the BOR-R line) from the ZERO side of flip-flop 284 indicates that the document now being operated upon has as its bin-of-origin, right bin 12.

A signal on line 244 (FIG. 5h) out of AND gate 242 (FIG. 5e) is applied as one input to OR gates 290 and 294. A signal on line 246 is applied as one input to OR gates 296 and 298. A signal on line 248 is applied as a second input to OR gates 290 and 298. A signal on line 252 is applied as a second input to OR gates 296 and 294. A signal on line 256 is applied as the third input to OR gates 296. A signal on line 258 is applied as the third input to OR gate 290. A signal on line 260 is applied as the third input to OR gate 298 and a signal on line 262 is applied as the third input to OR gate 294. The output from OR gate 290 is applied as one input to AND gate 300 while the output from OR gate 296 is applied as one input to AND gate 302. The output from OR gate 294 is applied as one input to AND gate 304 and the output from OR gate 298 is applied as one input to AND gate 306. The other input to AND gates 300 and 302 is derived from the line 184 while the other input to AND gates 304 and 306 is derived from the line 186. The outputs from AND gates 300 and 304 are applied through normally-closed contact 266B to the ONE-side input of bin-of-destination flip-flop 308. The outputs from AND gates 302 and 306 are applied through normally-closed contact 266A to the ZERO-side input of bin-of-destination flip-flop 308. When flip-flop 308 is in its ONE state, an output signal appears on line 310 (also referred to as the BDE-L line) indicating that the film strip containing the document now being operated upon is to be returned to left bin 10 (FIG. 1). A signal on output line 312 from the ZERO side of bin-of-destination flip-flop 308 indicates that the film strip containing the document now being operated upon is to be returned to the right bin 12.

A signal on line 310 is applied as one input to AND gates 314, 316, 318 (FIG. 5m) and 320. This signal is also applied to bi-directional drivers 194 (FIG. 5b) and 196 (FIG. 5e) to set there drivers so that when a drive signal is applied thereto they will supply half-select pulses tending to switch a core from its ZERO state to its ONE state. A signal on line 312 is applied as one input to AND gates 322, 324, 328, and 330. A signal on output line 286 from the ONE side of bin-of-origin flip-flop 284 is applied as one input to AND gates 332, and 334. A signal on line 288 is applied as one input to AND gates 336 and 338.

Figure 5F:
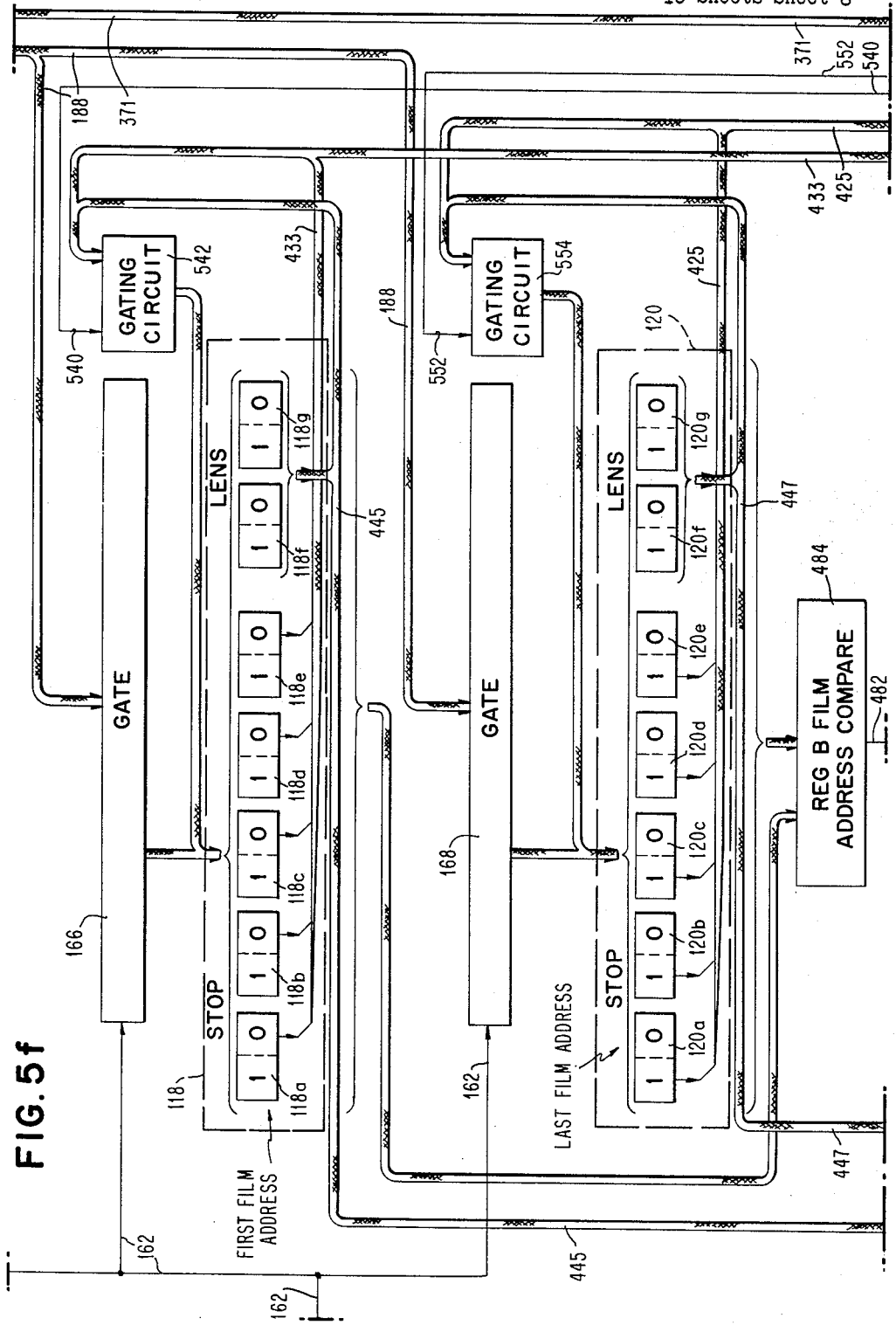
Figure 5H:
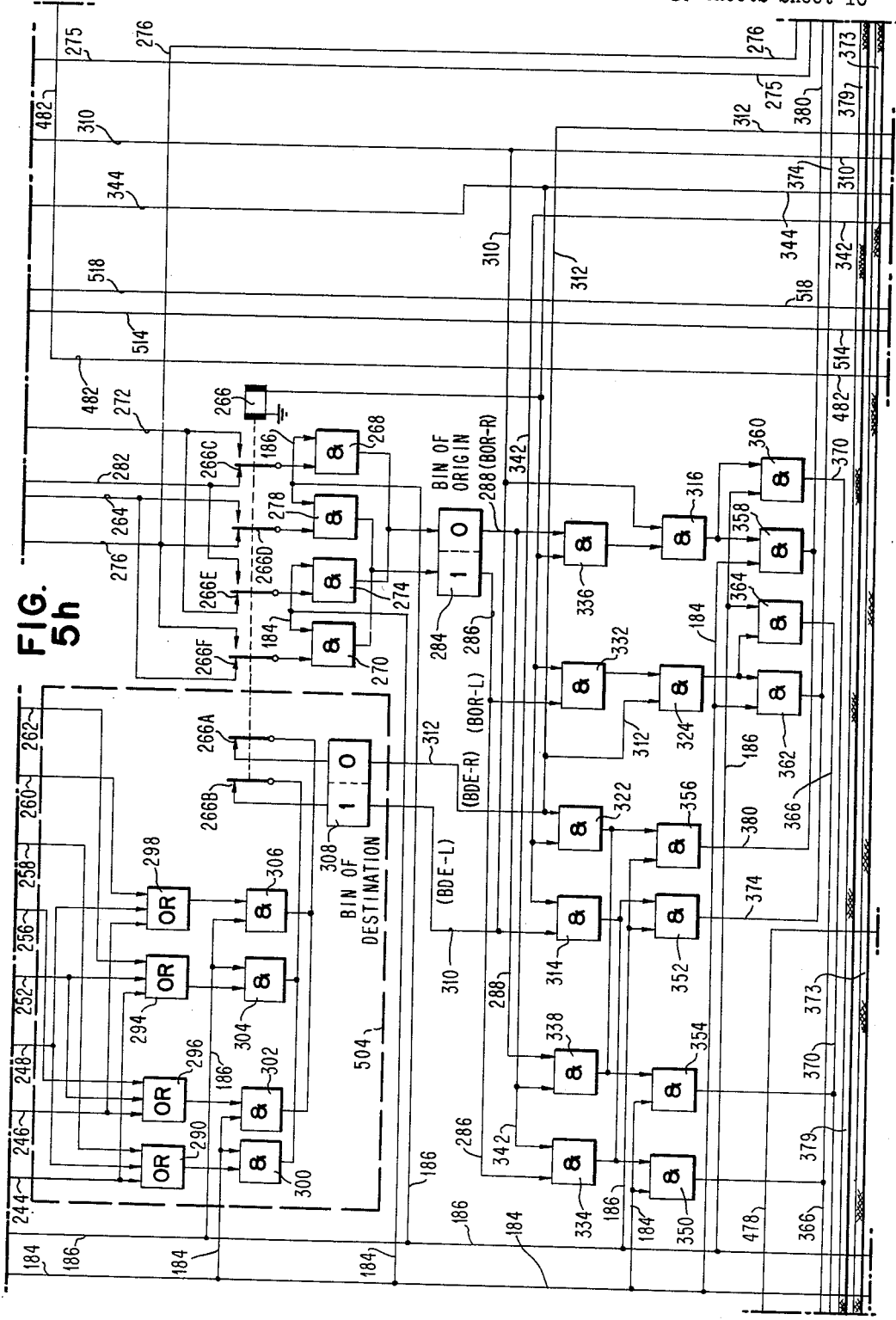

The other input to AND gates 334 and 338 is derived through line 342 from the ZERO-side output of flip-flop 340 (FIG. 5k). The ONE-side output from flip-flop 340 is applied through line 344 to form the second input of AND gates 314, 322, 332, and 336 (FIG. 5h). The signal on line 344 is also applied to relay 266 to energize this relay, and is applied as one input to AND gates 346 (FIG. 5c) and 348 (FIG. 5a). The other input to AND gate 348 is the line 184, indicating that the circuit is under primary control of register A while the other input to AND gate 346 is the line 186 indicating that the circuit is under primary control of register B. The output from AND gate 348 is applied through OR gate 200 to condition gates 202 while the output from AND gate 346 is applied through OR gate 212, to condition gates 214. As mentioned previously, the conditioning of gates 202 and 214 cause the bin address stored in the respective bin address flip-flops to be applied to Y line selector 206 and X line selector 210.

The output from AND gates 334 (FIG. 5h) and 314 are applied as one input to AND gates 350 and 352. The outputs from AND gates 322 and 338 are applied as one input to AND gates 354 and 356. The other input to AND gates 350 and 354 are supplied by line 184 indicating that the circuit is under primary control of register A while the other input to AND gates 352 and 356 is supplied by line 186, indicating that the circuit is under primary control of register B.

The other input to AND gate 316 (FIG. 5h) is derived from the output of AND gate 336 while the other input to AND gate 324 is derived from the output of AND gate 332. The output from AND gate 316 is applied as one input to AND gates 358 and 360. The output from AND gate 324 is applied as one input to AND gates 362 and 364. The other input to AND gates 358 and 362 is derived from the line 184, indicating that the circuit is under primary control of register A while the other input to AND gates 360 and 364 is derived from the line 186, indicating that the circuit is under primary control of register B.

The outputs from AND gates 350 (FIG. 5h) and 364 are applied through line 366 to condition gates 368 (FIG. 5g). The outputs from AND gates 354 and 360 are applied through line 370 to condition gates 372. The outputs from gates 352 and 362 are applied through line 374 to condition gates 378 (FIG. 5i) while the outputs from AND gates 356 and 358 are applied through line 380 to condition gates 382. Gates 368 and 378 pass the bin addresses from register A bin address flip-flops 106a–106f (FIG. 5a) and register B in address flip-flops 116a–116f (FIG. 5c), respectively, through cables 337 and 379, respectively, to the left bin control solenoid valves 46h–46v (FIG. 5g and FIG. 1) and into left bin compare circuit 384. Gates 372 and 382 pass the contents of the register A bin address flip-flops and the register B bin address flip-flops, respectively, through cables 373 and 381, respectively, into the right bin piston adder control valve 48v and 48h (FIG. 5i and FIG. 1), and into right bin compare circuit 386. Compare circuits 384 and 386 compare the numbers stored in the manner just indicated with the number applied to them by left bin position indicator 388 and right bin position indicator 390, respectively. The bin position indicators are sensing devices connected either to the piston adders or to the bins which indicate their actual position. The indicator may, for example, be a potentiometer, the sliding contact of which is connected to the output arm of the piston adder and the potential across which is proportional to the piston (and therefore the bin) position. An encoder may or may not be required between the position indicator and the compare circuit.

Figure 5M:
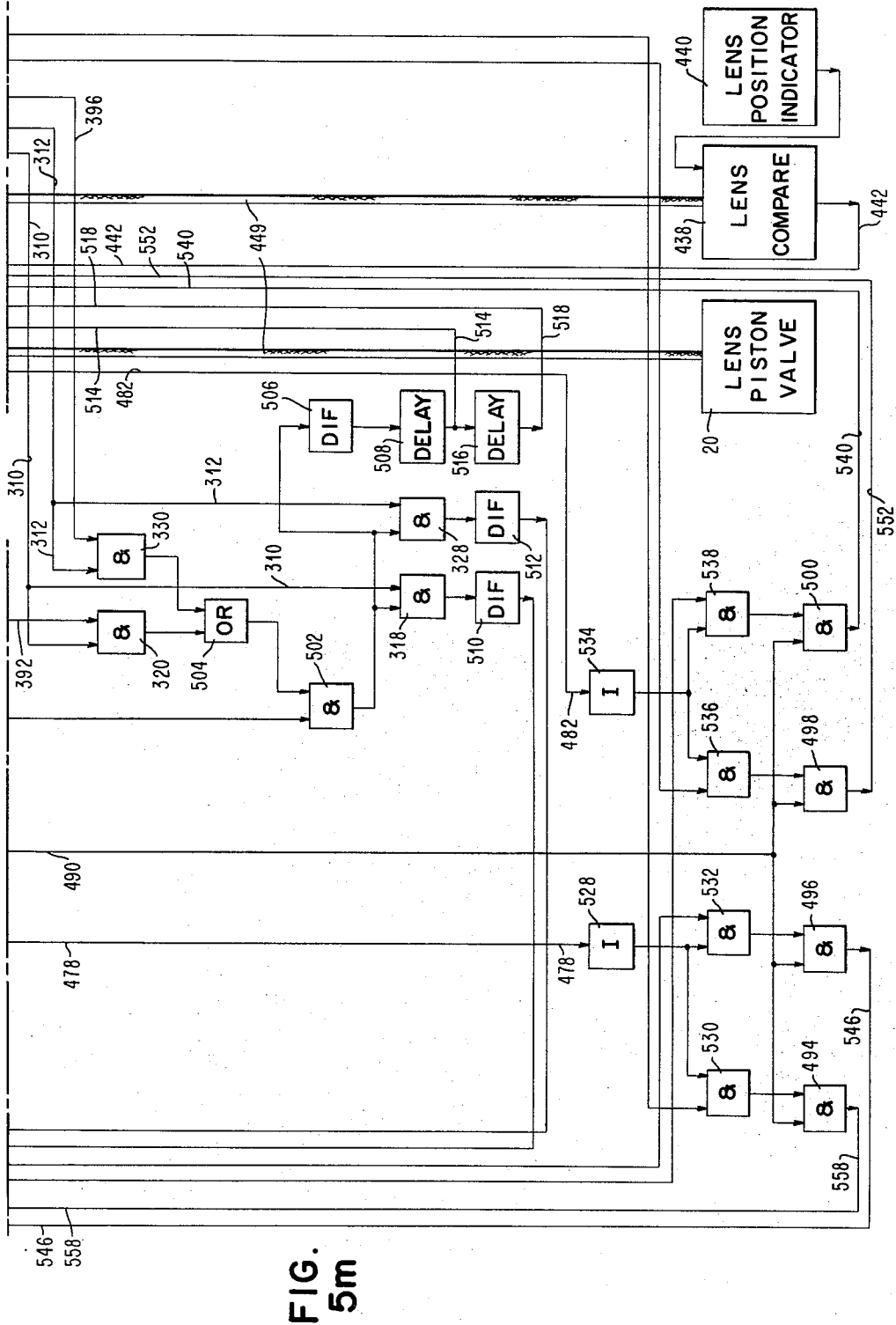

When the position indicated by indicator 388 agrees with the value stored in compare circuit 384, a signal appears on line 392 which is applied as one input to AND gate 394 (FIG. 5k) and as the second input to AND gate 320 (FIG. 5m). When the position indicated by indicator 390 agrees with the values stored in right bin compare circuit 386, this circuit generates an output signal on line 396 which is applied as one input to AND gate 398 and is applied as the second input to AND gate 330.

In addition to positioning the bin, circuitry must also be provided for positioning the film stops 26 and 28 in FIG. 1. It will be remembered that if a film strip is ejected from the right bin 12, it is stopped by the left film stops 26 and if a film strip is ejected from the left bin 10, it is stopped by the right film stops 28.

Referring to FIG. 5d, it is seen that the stop address contained in first film address flip-flops 108a–108e are applied through cable 399 to gate 400 (FIG. 5j) the conditioning signal from gate 400, being derived from the line 184 indicating that the circuit is under primary control of register A. The output from gate 400 is applied as one input gate 402. The conditioning signal for gate 402 is derived from OR gate 404. One input to OR gate 404 is the output from AND gate 406; the other input to OR gate 404 is the output from AND gate 408. As mentioned previously, one input to AND gate 406 is the output line 283 from the ZERO side of register A bin location flip-flop 112. One input to AND gate 408 is the output line 282 from the ZERO side of register B bin location flip-flop 122. The other input to AND gate 406 is the line 184 and the other input to AND gate 408 is the line 186. The output from gate 402 is applied to the valves 30 controlling the left film stops (also see FIG. 1) and to the left stop compare circuit 410. The other input to the compare circuit 410 is the signal from indicator contacts 90 (see FIG. 4). Depending on the nature of the compare circuit an encoder may be required between the indicator and the compare circuit. When the compare circuit indicates that the proper film stops in the left bank of film stops 26 have been raised, an output signal appears on line 412.

In addition to supplying the conditioning signal to gate 402, OR gate 404 also applies a signal through line 411, OR gate 413 (FIG. 5l) and differentiator 414 to switch flip-flop 416 to its ONE state. The ONE-side output from flip-flop 416 is applied to film stop air supply valve 33 (see FIG. 1) to cause air pressure to be applied to film stop valves 30 and 32.

The stop address contained in register A last-film-address flip-flops 110a–110e is applied through cable 417 to gates 418 (FIG. 5j), the conditioning signal for this gate being derived from the line 184. The output from gate 418 is applied through cable 420 as one of the inputs to gates 422 (FIG. 5l). The other input to gates 422 is derived from the output of gates 424. The input to gate 424 is the cable 425 from the register B last-film-address flip-flops 120a–120e. The conditioning signal to gates 424 is the line 186 indicating that the circuit is under primary control of register B. The conditioning signal to gates 422 is derived from the output of OR gate 426. The inputs to OR gate 426 are the outputs from AND gates 428 and 280. One input to AND gate 428 is the output line 275 from the ONE side of register A bin location flip-flop 112. One input to AND gate 280 is the output line 276 from the ONE side of register B bin location flip-flop 122. The other input to AND gate 428 is the line 184 and the other input to AND gate 280 is the line 186. The output from OR gate 426 is also applied through line 429 as the other input to OR gate 413.

The output from gates 422 is applied to the valves 32 (also see FIG. 1) for the right film stops and to the right stop compare circuit 430. When a right film stop has been raised, right film stop indicator 90 gives an indication of this to compare circuit 430. If the indicated film stops have been raised, an output signal appears on line 432. The signal on line 432 is applied as the other input to AND gate 394 (FIG. 5k).

The output from the register B first-film-address flip-flops 118a–118e is applied through cable 433 to the input of gates 434. The conditioning input to this gate is a line 186 indicating that the circuit is under primary control of register B. The outputs from gates 434 are applied through cable 435 as the other input to AND gates 402, and through these gates to left film stop valves 30 and left stop compare circuit 410.

For the desired document to be read, it is also necessary that the lens of optical read station 16 (FIG. 1) be positioned over the proper column of the film strip. To accomplish this, the outputs from register A first-film-address flip-flops 108f and 108g and from register A last-film-address flip-flops 110f and 110g are applied to gates 433 (FIG. 5j) and 436 respectively. These gates are conditioned by the outputs of AND gates 281 and 277 respectively. Similarly, the outputs from register B first-film-address flip-flops 118f–118g and register B last-film-address flip-flops 118f and 118g are applied to gates 437 (FIG. 5l) and 439 respectively. The conditioning signals for these gates are derived from AND gates 289 and 285 respectively. The outputs from gates 433, 436, 437 and 439 are applied through a common cable to control the lens piston valves 20 (FIG. 5m and FIG. 1) and to lens compare circuit 438. The other input to lens compare circuit 438 is from lens position indicator 440. When the lens is properly positioned, lens compare circuit 438 generates an output signal on line 442 which is applied as one input to AND gate 444.

A signal on either line 184 or on line 186 is passed through OR gate 445 (FIG. 5k) and differentiator 446 to switch flip-flop 448 to its ONE state. The output from the ONE side of flip-flop 448 is applied as one input to AND gates 450 and 452. The other inputs to AND gates 450 and 452 are derived from the outputs of AND gates 394 and 398, respectively. The outputs from AND gates 450 and 452 are differentiated in differentiators 454 and 456, respectively. The pulse out of differentiator 454 is applied to the solenoid of 3-way valve 38 (see FIG. 1) to cause air pressure to be momentarily applied to ejector 34, and through OR gate 458 to the ONE-side input of flip-flop 76 (also see FIG. 3a) to cause air to flow from left to right in transport path 14

(see FIG. 1). The pulse out of differentiator 456 is applied to 3-way valve 40 to momentarily cause air pressure to be applied to ejector 36 and is applied through OR gate 460 to the ZERO-side input of flip-flop 76, causing air to flow from right to left in transport path 14.

Flip-flop 448 is switched to its zero state by a pulse out of differentiator 462. The input signal to differentiator 462 is derived from the output of lens contact 464. Lens contact 464 may, for example, be an obstruction in transport path 14 at optical read station 16 which is moved to close a contact when the film strip reaches it. The closing of the lens contact causes an output signal to be generated which signal is also applied as one input to AND gates 466 and 468. The other input to AND gate 466 is derived from the output of OR gate 470, the inputs of which are derived from AND gates 474 and 476. One input to AND gate 474 is the output line 478 from register A film address compare circuit 480 (FIG. 5d). One input to AND gate 476 is the output 482 from register B film address compare circuit 484 (FIG. 5f). The other inputs to AND gates 474 and 476 are the lines 184 and 186, respectively. The functions of the film address compare circuits will be described later. The output from AND gate 466 (FIG. 5k) is applied to the ONE-side input of flip-flop 340, the outputs of which have been described previously.

The second input to AND gate 444 is derived through OR gate 486 from the outputs of AND gates 394 and 398. The output from AND gate 444 is applied as the other input to AND gate 468. The output from AND gate 468 is applied through differentiator 488 to cause the shutter of shutter-control light source 22 to be momentarily open. The opening of the shutter causes a contact attached thereto to be momentarily closed generating an output signal on line 490 which is applied as one input to AND gates 492 (FIG. 5k), 494 (FIG. 5m), 496, 498, and 500. The other input to AND gate 492 is the output from OR gate 470.

The output from AND gate 492 is applied as one input to AND gate 502 (FIG. 5m). The other input to AND gate 502 is derived from AND gates 320 and 330 through OR gate 504. The output from AND gate 502 is applied as the second input to AND gates 318 and 328 and is applied through differentiator 506 to delay 508. The outputs from AND gates 318 and 328 are applied through differentiators 510 and 512, respectively, to form the other inputs to OR gates 460 (FIG. 5k) and 458, respectively. The output from delay 508 is applied to delay 516 and through line 514 (the end-of-operation one line) to the ZERO-side input of flip-flop 416 (FIG. 5l) and as one input to OR gate 220 (FIG. 5e). The output from delay 516 is applied through end-of-operation two line 518 to the ZERO-side input of flip-flop 340 (FIG. 5k) and as one input to AND gates 522 and 524 (FIG. 5e).

In addition to triggering bi-directional drivers 194 (FIG. 5b) and 196 (FIG. 5e) to store in storage matrix 198 the bin to which the film strip is being sent, the output from OR gate 220 is also applied to as one input to AND gates 222 and 224. The other inputs to these AND gates are the lines 184 and 186. The output from AND gates 222 is applied to the ONE-side input of flip-flop 520 while the output from AND gate 224 is applied to the ZERO-side input of this flip-flop. The output from the ONE side of flip-flop 520 is applied as the other input to AND gate 522 while the output from the ZERO side of this flip-flop is applied as the other input to AND gate 524. The output from AND gate 522 is applied through line 523 to reset register A vacancy bit flip-flop 104 (FIG. 5a) to its ZERO state while the output from AND gate 524 is applied through line 525 to reset register B vacancy bit flip-flop 114 (FIG. 5c) to its ZERO state.

Referring back to register A film address compare circuits 480 (FIG. 5d), it is seen that the inputs to this circuit are derived from the output of register A first film address flip-flops 108a–108g and register A last-film-address flip-flops 110a–110g. The purpose of compare circuit 480 is to determine when the contents of these two sets of flip-flops are equal. Register B film address compare circuit 484 (FIG. 5f) performs a similar function with inputs from register B first-film-address flip-flops 118a–118g and register B last-film-address flip-flops 120a–120g. The signal on output line 478 of compare circuit 480 is applied through inverter 528 (FIG. 5m) as one input to AND gates 530 and 532. The output line 482 from compare circuit 484 is applied through inverter 534 as one input to AND gates 536 and 538. The other inputs to AND gates 530, 532, 536 and 538 are derived from the outputs of AND gates 428 (FIG. 5l), 406 (FIG. 5j), 280, and 408, respectively. The outputs from AND gates 530 and 532, 536, and 538 form the other inputs for AND gates 494, 496, 498, and 500, respectively. The output from AND gate 494 is applied through count-down line 558 to gating circuit 560 (FIG. 5d) to cause the address in last-film-address flip-flops 110a–110g to be appropriately decremented to read the next document. The output from AND gate 496 is applied to count-up line 546 to gating circuit 550 to cause register A first-film-address flip-flops 108a–108g to be incremented one position. The output from AND gate 498 is applied through count-down line 552 to gating circuit 554 (FIG. 5f). The triggering of this gating circuit causes last-film-address flip-flops 120a–120g to be decremented one position. The output from AND gate 500 is applied through count-up line 540 to gating circuit 542 to cause the contents of first-film-address flip-flops 118a–118g to be incremented one position.

*Detailed Description of Operation*

For the purpose of illustrating the operation of the invention, it will again be assumed that the following sequence of requests is applied to the device by input request source 100:

| Request No. | Register Used | Bin of Origin | Bin of Destination | Bin Address | First Film Address | Last Film Address |
|---|---|---|---|---|---|---|
| 1 | Register A | Left Hand | Right Hand | 5 | 10 | 10 |
| 2 | Register B | do | Left Hand | 7 | 12 | 12 |
| 3 | Register A | Right Hand | do | 24 | 15 | 15 |
| 4 | Register B | do | Right Hand | 19 | 14 | 15 |
| 5 | Register A | Left Hand | do | 33 | 19 | 19 |

It will be assumed that originally all the flip-flops in FIGS. 5a–5m are in their ZERO state. This being true, both vacancy bit flip-flops 104 (FIG. 5a) and 114 (FIG. 5c) are in their ZERO state, causing output signals to appear on lines 124 and 136. These signals are passed through OR gate 126 to line 102, causing input request source 100 (FIG. 5b) to start an output cycle and are also applied to fully condition AND gate 130, causing an output signal to be generated through OR gate 144 on line 146.

The triggering of input request source 100 causes the information as to the bin address and the first and last film addresses for the first requested document to be applied by input request source 100 to lines 188. Referring to the above chart, it is seen that where a single document is to be read from a film strip, the address of this document is applied to both the first and last address flip-flops. Gates 148 (FIG. 5a), 150 (FIG. 5d) and 152 are at this time conditioned by the signal on line 146 and the information on line 188 is therefore passed into the register A bin address, first film address, and last film address flip-flops 106a–106f, 108a–108g and 110a–110g, respectively.

A short time after this operation has been completed, a timing pulse is applied to line 190 by input request source 100. This timing pulse finds AND gate 150 (FIG. 5e) conditioned by the signal on line 146 and passes through this AND gate to switch register A bin location flip-flop 112 to its ZERO state.

A short time after the pulse on line 190, input request source 100 applies a timing pulse to line 192. This timing pulse sets bi-directional drivers 194 and 196, so that when they are energized, they will supply drive pulses of a polarity tending to switch a core in magnetic core storage matrix 198 from its ONE state to its ZERO state. The timing pulse on line 192 is also applied through conditioned AND gate 156 (FIG. 5a) and OR gate 200 to condition gates 202 to pass the contents of register A bin address flip-flops 106a–106c and 106d–106f through lines 204 and 208, respectively, to set the bin address (in this case, 5) into line selectors 206 (FIG. 5b) and 210.

A short time after the pulse on line 192, input request source 100 applies a timing pulse to the line 216, which signal is applied to condition output AND gate 218 (FIG. 5e) and is also applied through OR gate 220 to trigger bi-directional drivers 194 and 196. Since, referring back to the table, the bin of origin in this case is the left-hand bin, the core in magnetic core storage matrix 198, corresponding to address 5, is in its ONE state at this time. This core is switched to the ZERO state by the two half-select signals applied to it by drivers 194 and 196, causing an output signal to appear on sense line 226. This signal is passed through conditioned AND gate 218 and conditioned AND gate 158 to set register A bin location flip-flop 112 to its ONE state.

A short time after the switching of the core matrix 198 has been completed, input request source 100 generates a timing pulse on line 228 which is applied through conditioned AND gate 154 (FIG. 5a) to switch register A vacancy bit flip-flop 104 to its ONE state. This causes AND gate 130 to be deconditioned and AND gate 138 to be conditioned. The output from AND gate 138 is applied through differentiator 182 to switch primary control flip-flop 180 to its ONE state, thus indicating that the system is under primary control of register A. This means, that, until otherwise indicated, line 184 has a signal thereon and line 186 has no signal thereon.

At this time, two things are happening. Since register A has been loaded, the circuit can now commence to act on this information to cause the requested document to be selected and read out; but, since vacancy bit flip-flop 114 is still in its ZERO state, there is still a signal on line 136 which is applied through OR gate 126 (FIG. 5b) to line 102 causing input request source 100 to undergo a second output cycle. For the purposes of this description, it will be assumed that the output cycle of input request source 100 requires a considerably shorter period of time than is required to select and process a document. Therefore, the loading of register B will be described before the operations on the information stored in register A are described, it being assumed that register B would be loaded for a very substantial portion of the time that these operations are occurring.

AND gate 138 (FIG. 5a) being fully conditioned, causes a signal to appear on line 162. Therefore, when input request source 100 applies the information as to the bin address, first film address and last film address for the second requested document to line 188, gates 164 (FIG. 5c), 166 and 168 are conditioned, causing this information to be applied to register B bin address flip-flops 116a–116f, first film address flip-flops 118a–118g and last film address flip-flops 120a–120g, respectively. The signal applied to line 190 now finds AND gate 176 (FIG. 5e) conditioned and is passed therethrough to switch register B bin location flip-flop 122 to its ZERO state. A short time later, a signal is applied to line 192 and through conditioned AND gate 172 (FIG. 5c) and OR gate 212 to condition gates 214 to pass the bin address information in bin address flip-flops 216a–216c and 216d–216f through lines 216 and 218, respectively, to the line selectors 206 and 210. The signal on line 192 is also applied to bi-directional drivers 194 and 196, to set these drivers so that when they are energized, they will generate half-select signals, tending to switch a core from the ONE to the ZERO state. A short time later, a signal is applied to line 216 to condition AND gate 218 (FIG. 5e) and to pass through OR gate 220 to trigger drivers 194 and 196. Since the bin of origin for the second requested document is also the left hand bin, the core corresponding to its bin address (the core corresponding to bin address 7) is in its ONE state and is switched to its ZERO state by the drive signals applied to it, causing an output signal on sense line 226. This signal is passed through conditioned AND gate 218 and conditioned AND gate 174 to switch register B bin location flip-flop 122 to its ONE state.

A short time after the pulse is applied to line 216, a timing pulse is applied to line 228 by input request source 100, this pulse passing through conditioned AND gate 170 (FIG. 5c) to switch register B vacancy bit flip-flop 114 to its ONE state. At this time, the vacancy bit flip-flops for both register A and register B are in their ONE states, indicating that both registers have information therein. When this occurs, input request source 100 is idle until the information in one of the registers has been used and it is ready to receive new information.

At this time, both register A bin location flip-flop 112 and register B bin location flip-flop 122 are in their ONE state, and both register A vacancy bit flip-flop 104 and register B vacancy bit flip-flop 114 are in their ONE state. Therefore, AND gates 232 (FIG. 5e) and 238 are both fully conditioned. AND gates 232 and 238 both being conditioned, causes an output signal from AND gate 245 which is applied through OR gate 296 (FIG. 5h) to one input of AND gate 302. Since line 184 has a signal thereon, this signal is passed through AND gate 302 and through the normally closed contact 266A of relay 266 to switch bin of destination flip-flop 308 to its ZERO state. This means that the film strip containing the first requested document should be returned to the right hand bin 12 (FIG. 1) as in fact it should be. It should be noted that so long as contacts 266A and 266B remain closed, the decision as to the bin of destination may be changed as variations in the input data may indicate. However, as will be seen later, once the requested document has been read out, contacts 266A and 266B are opened and no further change is permitted in the decision as to the destination of the film strip.

The output from AND gate 232 (FIG. 5e) is also applied through line 264 and normally closed contact 266F (FIG. 5f) to form one input to AND gate 270. This AND gate is conditioned by the signal on line 184 and generates an output signal which switches bin of origin flip-flop 284 to its ONE state. This indicates that the bin of origin is the left hand bin which, again, is in fact true.

Register A bin location flip-flop 112 (FIG. 5e) being in its ONE state, causes a signal to be applied through line 275 to AND gate 428 (FIG. 5l). This AND gate is conditioned by the signal on line 184, causing an output signal to be applied through OR gate 426 to condition gate 422. The output from OR gate 426 is also applied through line 429, OR gate 413, and differentiator 414 to the ONE-side input of flip-flop 416. The switching of flip-flop 416 to its ONE state causes film stop air supply valve 33 (also see FIG. 1) to be energized. The output from AND gate 428 is also applied to AND gate 530 but, since the addresses in the first film address and the last film address flip-flops of register A are the same, there is a signal on line 478, which prevents inverter 528 from generating an output signal.

The signal on line 184 is applied to condition gates 418 (FIG. 5j) causing the last film address information contained in register 110a–110e to be applied through cable 417, gate 418 and cable 420 to conditioned gates 422. The outputs from gates 422 are applied to the right film stop valves 32 and to the right film stop compare circuit 430.

A word should be said at this point as to why it is the last film address rather than the first film address which determines which right film stop valves are to be energized. Referring to FIG. 2, it is seen that the address 0000000 is at the extreme upper left hand corner of the film strip and that the addresses get higher as one proceeds to the right. Since as was mentioned previously, the film strip cannot be turned around in the system, the right hand film stops are abutting the higher order end of the film strip whereas the left hand film stops abut the lower order end of the film strip. The procedure is to raise all the film strips behind the first indicated stop and then to lower successive stops, the film strip being incremented forward by the viscous drag force of the air applied to transport rails 14, until all of the desired documents have been read out. It can be seen that for this procedure to be effective when a document is ejected from left bin 10 against right film stops 28, the first document to be read out must be the highest numbered one in the chain to be read. For this reason, the right film stop valves are controlled by the last film address registers of registers A and B.

In addition to setting the proper right film stop 28, it is also necessary that the lens of optical read station 16 be positioned over the proper column in the document. Again, it is the last film address which controls. Since register A bin location flip-flop 112 is in its ONE state, there is a signal on line 275 which is applied to condition AND gate 277 (FIG. 5j). The other input to this AND gate is the signal on line 184. AND gate 277 is therefore fully conditioned causing an output signal which conditions gates 436 to pass the lens address contained in register A last film address flip-flops 110f–110g to lens piston valves 20 (FIG. 5m and FIG. 1) and to lens compare circuit 438. The energization of the valves 20 causes piston adder 18 (FIG. 1) to be moved to properly position the lens in optical read station 16 over the column of the film strip containing the desired document.

Finally, it is necessary that the bin address information be applied to valves 46h and 46v (FIG. 1). Since bin of origin flip-flop 284 (FIG. 5h) is in its ONE state, a signal is applied to partially condition AND gate 334. The other input to this AND gate is derived through line 342 from the ZERO side output of flip-flop 340 (FIG. 5k). This flip-flop is still in its ZERO state at this time. The output from AND gate 334 is applied to partially condition AND gate 350. AND gate 350 is fully conditioned at this time by the signal on line 184, causing an output signal on line 366 which is applied to condition gates 368 (FIG. 5g). The inputs to AND gates 368 are the outputs from bin address flip-flops 106a–106f. This information is passed through conditioned gate 368 to left bin piston valve 46h and 46v and to left bin compare circuit 384.

At this time, the necessary information has been applied to all the valves shown in FIG. 1 and the device is positioning itself to eject and read the first requested document. When bin 10 (FIG. 1) reaches the proper position, the signal generated by left bin position indicator 338 (FIG. 5g) compares favorably with the information stored in left bin compare circuit 384 and an output signal is generated on line 392. The raising of the proper stops causes right stop compare circuit 430 (FIG. 5l) to generate an output signal on line 432 and the movement of the lens to the desired position causes lens compare circuit 438 (FIG. 5m) to generate an output signal on line 442. The signals on lines 392 and 432 fully condition AND gate 394 (FIG. 5k) causing it to generate an output signal to partially condition AND gate 450 and to pass a signal through OR gate 486 to partially condition AND gate 444. AND gate 444 is fully conditioned at this time by the signal on line 442 from lens compare circuit 438. The output from AND gate 444 is applied to partially condition AND gate 468.

The signal on line 184 had previously been passed through OR gate 445 (FIG. 5k) and differentiator 446 to set flip-flop 448 to its ONE state. The output from the ONE side of flip-flop 448 fully conditions AND gate 450, causing it to apply a signal to differentiator 454. The pulse out of differentiator 454 is applied through OR gate 458 to the ONE side input of flip-flop 76 to cause valve 64 (FIG. 32) to be opened allowing air to flow through air channel 66 and manifold 68 to air jets 60 tending to drive a film strip from left to right in transport path 14 (FIG. 1). The pulse out of differentiator 454 is also applied to 3-way valve 38 (FIG. 1) to cause air to be momentarily applied to ejector 34 to blast the film strip containing the requested document out of bin 10 and into transport path 14. As the film strip passes lens contact 464 (FIG. 5k) it closes this contact, causing a signal to be applied to AND gate 468 to fully condition this AND gate. The output from AND gate 468 is applied to differentiator 488. The pulse out of differentiator 488 is applied to shutter mechanism 22. This causes the shutter to be momentarily opened to pass a beam of light through the lens of optical read station 16 and through the requested document to reproduce this document on output film 24.

The closing of lens contact 464 also causes a signal to be applied to AND gate 466 and to be applied through differentiator 462 to the ZERO-side input of flip-flop 448 to reset this flip-flop to its ZERO state. Since the contents of the first film address and the last film address flip-flops in register A are the same, register A film address compare circuit 480 (FIG. 5d) generates an output signal on line 478 which is applied to AND gate 474 (FIG. 5k). This AND gate is conditioned by the signal on line 184 causing an output signal to be passed through OR gate 470 to partially condition AND gate 492 and to fully condition AND gate 466. The output from AND gate 466 is applied to switch flip-flop 340 to its ONE state. The switching of flip-flop 340 to its ONE state causes an output signal to appear on line 344 which energizes relay 266 (FIG. 5h) causing the contents of bin of destination flip-flop 308 to be frozen and causing control of bin of origin flip-flop 284 to be switched from register A to register B. This allows a signal to pass from the ONE side output of register B bin location flip-flop 122 through line 276, the now-closed contact 266F, and conditioned AND gate 270 to the ONE side input of bin-of-origin flip-flop 284. Since this flip-flop is already in its ONE state, this signal causes no change in the state thereof.

The signal on line 344 is also applied to conditioned AND gate 348 (FIG. 5a) causing an output signal therefrom which is passed through OR gate 200 to condition gates 202. This causes the address of the film strip containing the first requested document to be reapplied to line selectors 206 and 210.

As was mentioned before, the output from OR gate 470 (FIG. 5k) partially conditions AND gate 492. The other input to this AND gate is derived from the line 490 which is energized when shutter mechanism 22 is opened. The line 490 also applies a signal to AND gates 494–500, but since there is a signal on lines 478, inverter 528 does not generate an output signal and these signals are ineffective. The output from AND gate 492 is applied as one input to AND gate 502 (FIG. 5m). For the other input to AND gate 502 to be present, right bin 12 must be properly positioned to receive the film strip which is about to be applied to it. The positioning of this bin is accomplished in the following manner: when flip-flop 340 (FIG. 5k) was switched to its ONE state, the signal on line 344 was also applied as one input to AND gate 322 (FIG. 5h). The other input to AND gate 322 is the output line 312 from the ZERO side of bin of destination flip-flop 308. The output signal from AND gate 322 is applied as one input to AND gate 354, the other input to this AND gate being derived from line 184. The output from AND gate 354 is applied through line 370 to condition gate 372 (FIG. 5g). The input to gate 372 is the bin address information contained in register A bin address flip-flops 106a–106f. Therefore, when AND gate 372 is conditioned, it passes this information through line 373 to right bin piston valves 48h and 48v and to right bin compare circuit 386 (FIG. 5i). When right bin indicator 390 indicates that the bin has reached the proper position, compare circuit 386 generates an output signal on line 396 which is applied as one input to AND gate 330 (FIG. 5m). The other input to this AND gate is the signal on BDE–R line 312. The output from AND gate 330 is applied through OR gate 504 to form the other input to AND gate 502.

It should be noted that at the same time right bin 12 is being positioned to receive the film strip containing requested document number one, left bin 10 is being positioned to eject the film strip containing requested document number two. To accomplish this, the beforementioned signal on line 344 is applied to fully condition AND gate 332 (FIG. 5h), the other input in this AND gate being derived from BOR–L line 286. The output from AND gate 332 is applied to AND gate 324 which gate is conditioned at this time by the signal on BDE–R line 312. The output from AND gate 324 is passed through conditioned AND gate 362 and line 374 to condition gates 378 (FIG. 5i). This allows gates 378 to pass the contents of register B bin address flip-flops 116a–116f through line 379 to left bin piston valves 46v and 46h and to left bin compare circuit 384 (FIG. 5g). The signals applied in this manner to left bin piston valves 46v and 46h cause left bin 10 to be positioned to eject the film strip containing requested document number two into transport path 14.

The output from AND gate 502 (FIG. 5m) is applied as one input to AND gate 328 and as the input to differentiator 506. The other input to AND gate 328 is BDE–R line 312. The output from AND gate 328 is applied through differentiator 512 and OR gate 458 (FIG. 5k) to the ONE side input of flip-flop 76. Since flip-flop 76 is already in its ONE state, this signal is ineffective to cause any change.

The pulse out of differentiator 506 (FIG. 5m) is applied to delay 508. The output from delay 508 is applied to end-of-operation one line 514 and is also applied to delay 516. Delay 508 is of sufficient duration to allow flip-flop 76 to be set to cause air flow in transport path 14 in the appropriate direction to return the utilized film strip to the desired bin. The signal on line 514 is applied to the ZERO side input of flip-flop 416 (FIG. 5l) and is also applied through OR gate 220 (FIG. 5e) to one input of AND gate 222 and to bi-directional drivers 194 and 196 to trigger these drivers. Since BDE–L line 310 is not energized, the bi-directional drivers are still set to drive a core from the ONE state to the ZERO state. Therefore, the core indicated by X and Y line selectors 206 and 210, the core corresponding to bin position 5 is left in its ZERO state indicating that the document is now stored in the right hand bin. AND gate 222 is fully conditioned by the signal on line 184, causing flip-flop 520 to be switched to its ONE state.

The switching of flip-flop 416 to its ZERO state turns film stop air supply valve 33 off, causing all the raised film stops to return to their retracted position. The viscous drag effect of the air flowing through jets 60 (FIG. 3b) in transport path 14, causes the utilized document to be driven into the right hand bin 12. Since this bin has previously been positioned with position 5 in line with transport path 24, the film strip is returned to this position in bin 12.

The signal out of delay 508 (FIG. 5m) is delayed sufficiently in delay 516 to allow the above two operations to be completed. When these operations have been completed, delay 516 applies a signal to end-of-operation two line 518. This signal is applied to the ZERO side input of flip-flop 340 to return this flip-flop to its ZERO state and is also applied to the other input of conditioned AND gate 522 (FIG. 5e). The output from AND gate 522 is applied through line 523 to the ZERO side input of register A vacancy bit flip-flop 104 (FIG. 5a) to switch this flip-flop to its ZERO state.

At this time, the vacancy bit flip-flop for register A, 104, is in its ZERO state, causing a signal to be applied to line 124 and the vacancy bit flip-flop for register B, 114, is in its ONE state, causing a signal to be applied to line 236. This causes AND gate 128 (FIG. 5a) to be fully conditioned and also causes a signal to be applied through OR gate 126 and line 102 to input request source 100. The output from AND gate 128 is applied through differentiator 178 to the ZERO side input of primary control flip-flop 180, causing this flip-flop to be switched to its ZERO state. This means that, till otherwise indicated, the output line 186 from the ZERO side of primary control flip-flop 180 is energized and the line 184 is de-energized. The output from AND gate 128 is also applied through OR gate 144 to line 146.

Again, for convenience, it will be assumed that the output cycle of input request source 100 requires a considerable shorter period of time than is required to process the information stored in the primary control register, in this case register B, and therefore, the output cycle of source 100 during which information relative to the third requested document is applied to the circuit will be described before the processing of the information stored in register B is described. Since the most time consuming operation in the utilization of the information stored in the registers is the positioning of the bins 10 and 12, and since, as was noted previously, this operation has already been performed for the second requested document during the processing of the information relative to the first requested document, the above assumption is not completely valid. However, this is a convenient assumption and does not in any way alter the manner in which the device operates.

Since line 146 is conditioned at this time, the information as to bin address, first film address, and last film address are applied to the flip-flops of register A as previously indicated for the first requested document. The signal on line 190 is again applied to switch register A bin location flip-flop 112 (FIG. 5e) to its ZERO state and the signal on line 192 is again applied to set the bi-directional drivers to drive a core from its ONE state to its ZERO state and to gate the bin address into Y line selector an X line selectors 206 and 210, respectively. However, since the bin of origin in this case is the right hand bin, the core in magnetic core storage matrix 198 corresponding to the bin position of requested document number 3, the core corresponding to bin position 24, is in its ZERO state. Therefore, when the timing pulse is applied to line 216 to trigger bi-directional drivers 194 and 196, this core is not switched and no signal appears on sense line 226. Register A bin location flip-flop 112 therefore remains in its ZERO state. The signal applied to line 228 again passes through conditioned AND gate 154 (FIG. 5a) to set register A vacancy bit flip-flop 104 to its ONE state. Vacancy bit flip-flops 104 and 114 both being in their ONE state deconditions OR gate 126 to stop the flow of input data from input request source 100.

As was mentioned previously, the bin 10 containing the film strip for the second requested document was positioned during the processing of the first requested document. Assuming that this operation has been completed, there is a signal on line 392. Before this document can be ejected for processing, the right film stops must be set and the lens properly positioned. It is also necessary that the bin of destination and bin of origin flip-flops 308 and 284, respectively, be properly set.

Register B bin location flip-flop 122 and vacancy bit flip-flop 114 both being in their ONE state, causes signals to be applied to both inputs of AND gate 238 (FIG. 5e). Also, since register A bin location flip-flop 112 is in its ZERO state, and register A vacancy bit flip-flop 104 is in its ONE state, AND gate 234 has an output. The outputs from AND gates 234 and 238 are applied to AND gate 250. The output line 252 from AND gate 250 is applied through OR gate 294 (FIG. 5h) as one input to AND gate 304. The other input to AND gate 304 is the line 186. The output from AND gate 304 is applied through normally closed contact 266B to switch bin of destination flip-flop 308 to its ONE state. This means that the bin of destination for the film strip containing the second requested document is the left hand bin which, reference to the chart at the beginning of this section shows is true.

The output line 276 from the ONE side of register B bin location flip-flop 122 is applied through normally closed contact 266D (FIG. 5h) to one input of AND gate 278. The other input to this AND gate is the line 186. The output from AND gate 278 is applied to the ONE side input of bin of origin flip-flop 284. This indicates that the bin of origin for the film strip containing the second requested document is the left hand bin.

It should be noted that the output on line 286 from the ONE side of bin of origin flip-flop 284 is applied as one input to AND gate 334, the other input of which is the output line 242 from the ZERO side of flip-flop 340. The output from this AND gate is applied through conditioned AND gate 352 and line 374 to condition gates 378 (FIG. 5i) to pass the bin address information contained in register B bin address flip-flops 116a–116f to left bin piston adder valves 46h and 46v and to left bin compare circuit 384. This operation is merely a perfunctory one since this information was already applied to the valves during the previous cycle.

However, it is still necessary to get the lens position and film stop position information to the proper valves. The output signal from the ONE side of register B bin location flip-flop 122 is applied through line 276 as one input to AND gate 280 (FIG. 5l) the other input of which is the line 186. The output from AND gate 280 is applied through OR gate 426 to supply the conditioning input to gates 422. One input to gates 422 is the output from gates 424 which gates are conditioned by the signal on line 196. The inputs to gates 424 are the outputs from Register B last film address flip-flops 120a–120e. The output from gates 422 are applied to right film stop valves 32 and to right stop compare circuit 430.

The output from OR gate 426 is also passed through OR gate 413 and differentiator 414 to set flip-flop 416 to its ONE state, thereby energizing film-stop-air-supply valve 33. The reason why the information as to the stop position is derived from the last film address flip-flops rather than the first film address flip-flops has already been indicated. When the stops have been properly positioned, right stop compare circuit 430 generates an output signal on line 432.

The signal on line 276 is also applied as one input to AND gate 285 (FIG. 5l) the other input to this AND gate being the line 186. The output from AND gate 285 is applied to condition gates 439. The inputs to gates 439 is the output from register B last film address flip-flops 120g–120f. The output from gates 439 are applied to lens piston adder valves 20 and to lens compare circuit 438 (FIG. 5m). When the lens has been properly positioned, an output signal appears on line 442.

Everything is now positioned for the ejection of the second requested document. It should be mentioned, that the operations described above with respect to the second request document, require a very short period of time since the bin containing this document has already been positioned. When the signal was originally applied to line 186, this signal was converted into a pulse in differentiator 446 (FIG. 5k) and applied to the ONE side input of flip-flop 448 to switch this flip-flop to its ONE state. The signal from left bin compare circuit 384 on line 392 and the signal from right stop compare circuit 430 on line 432 are applied to fully condition AND gate 394. The output from AND gate 394 is applied as one input to AND gate 450 and through OR gate 486 as one input to AND gate 444. The other input to AND gate 450 is the output from the ONE side of flip-flop 448. The output from AND gate 450 is applied to differentiator 454. The resulting pulse out of differentiator 454 is applied through OR gate 458 to the ONE side input of flip-flop 76, causing valve 66 (FIG. 3a) to be energized to cause air flow through air channel 66 and manifold 68 into nozzles 60 of transport path 14. The output from differentiator 454 is also applied to 3-way valve 38 (FIG. 1) to cause air pressure to be momentarily applied through this valve to ejector 34. This causes the film strip containing the second requested document to be ejected from the left hand bin into transport path 14 where the viscous drag effect of the air flowing through angled nozzles 60 on the surface of the film strip urges it along the transport path and up against the first raised right hand film stops 28.

Since the first film address and the last film address flip-flops of Register B contain the same address at this time, Register B film address compare circuit 484 (FIG. 5f) generates an output signal on line 482 which is applied as one input to AND gate 476 (FIG. 5k). The other input to this AND gate is derived from the line 186. The output from AND gate 476 is applied through OR gate 470 to form one input to AND gates 466 and 492. As the film strip passes lens contact 464, this contact is closed, causing a signal to be applied to the other input of AND gate 466 to switch flip-flop 340 to its ONE state. The output from the ONE side of flip-flop 340 is applied through the line 344 to (a) partially condition AND gates 314 and 336 (FIG. 5h), (b) energize relay 266, and (c) partially condition AND gate 346 (FIG. 5c). The transferring of relay 266 opens contact points 266A–266B freezing the contents of bin of destination flip-flop 308 in the ONE state and transfers contacts 266C–266F, thereby transferring control of bin of origin flip-flop 284 from register B to register A. Since register A bin location flip-flop 112 is in its ZERO state, AND gate 234 is fully conditioned. The output from this AND gate is applied through line 272 and now close contact of 266C to one input of AND gate 268. The other input to this AND gate is derived from line 186. The output from AND gate 268 is applied to the ZERO side input of bin of origin flip-flop 284 to switch this flip-flop to its ZERO state. The output from the ZERO side of flip-flop 284 on the BOR-R line 288 is applied as one input to AND gate 336, the other input of which is the line 344 from the one side output of flip-flop 340. The output from AND gate 336 is applied as one input to AND gate 316, the other input of which the output line 310 from the ONE side of bin of destination flip-flop 308. The output from AND gate 316 is applied as one input to AND gate 360, the other input of which is the signal on line 186. The output from AND gate 360 is applied through line 370 to condition gates 372 (FIG. 5g) to pass the bin address contained in register A bin address flip-flops 106a–106f through gates 372 and lines 373 to right bin piston valves 48v and 48h and right bin compare circuit 386. The circuit is in this way set to position the right hand bin 12 to eject a film strip containing the third desired document.

The signal on line 310 from the ONE-side output of bin of destination flip-flops 308 (FIG. 5h) is also applied to gate 314, the other input of which is the signal on line 344 from the ONE-side output of flip-flop 340. The output from AND gate 314 is applied to gate 352, which gate is conditioned by the signal on line 186. The output from AND gate 352 is applied through line 374 to condition gates 378 (FIG. 5i) to pass the bin address contained in register B bin address flip-flops 116a–116f through gates 378 and cable 379 to left bin piston valves 46v and 46h in left bin compare circuit 384 (FIG 5g). The purpose of this operation is to position the left hand bin to receive the film strip containing the second requested document. However, since this film strip was ejected from the left hand bin originally, the left hand bin is already properly positioned and a signal will immediately appear on line 392 indicating this condition.

Gate 346 (FIG. 5c) is at this time fully conditioned by the signal on line 186 causing an output signal to be applied through OR gate 212 to condition gates 214 to pass the bin address information in flip-flops 116a–116c and 116d–116f through lines 216 and 218 respectively to line selectors 206 and 210. The use to which this information is put will be described later.

The closing of lens contact 464 (FIG. 5k) also causes a signal to be applied through differentiator 462 to switch flip-flop 448 to its ZERO state and causes a signal to be applied to one input of AND gate 468. The other input to AND gate 468 is derived from AND gate 444 which is fully conditioned at this time by the input from OR gate 486 and the signal on line 442 from lens compare circuit 438. The output from AND gate 468 is applied through differentiator 488 to trigger shutter mechanism 22. As was previously indicated, the energizing of shutter mechanism 22 causes the shutter to be momentarily opened, causing requested document No. 2 to be reproduced on output film 24 (FIG. 1). When the shutter opens, it causes a shutter contact to be closed generating an output signal on line 490 which is applied to AND gate 492 to fully condition this AND gate. The output from AND gate 492 is applied as one input to AND gate 502 (FIG. 5m). Since the BDE-L line 310 and line 392 both have signals thereon, AND gate 320 is fully conditioned, causing an output signal to be applied through OR gate 504 to fully condition AND gate 502. The output from AND gate 502 is applied as one input to AND gate 318 and is also applied through differentiator 506 to delay 508. AND gate 318 which is fully conditioned by the signal on BDE-L line 310, generates an output signal which is converted into a pulse by differentiator 510 and applied through OR gate 460 (FIG. 5k) to the ZERO side input of flip-flop 76. Referring to FIG. 3a, it is seen that this causes valve 70 to be energized allowing air pressure to be applied though air channel 72 and manifold 74 to air nozzles 62 (FIG. 3b) tending to drive a film strip from right to left. The viscous drag force of the air issuing from nozzles 62 on the surface of the film strip drives the film strip to the right in channel 14 and into position 7 of left-hand bin 10.

After a short delay, a signal is applied by delay 508 (FIG. 5m) to end-of-operation-one line 514. This signal is applied to the ZERO side input of flip-flop 416 (FIG. 5l) causing this flip-flop to be switched to its ZERO state, thereby de-energizing film stop air supply valve 33. This signal is also applied through OR gate 220 (FIG. 5e) to trigger bi-directional drivers 194 and 196 and to condition AND gate 224. Since bin of destination flip-flop 308 (FIG. 5h) is in its ONE state at this time, there is a signal on line 310 which sets bi-directional drivers 194 and 196 so that, when the drive signal is applied to these drivers by line 514, they apply half select signals to magnetic core storage matrix 198, tending to drive the selected core indicated by line selectors 206 and 210 in its ONE state. This indicates that the film strip stored in the corresponding position of the storage bins is in left bin 10. AND gate 224 is fully conditioned by the signal on line 186 causing an output signal to be applied to the ZERO side input of flip-flop 520 to switch this flip-flop to its ZERO state.

After a short delay, the signal applied by delay 508 (FIG. 5m) to delay 516 is applied by delay 516 to end-of-operation-two line 518. The signal on line 518 is applied to the ZERO side input of flip-flop 340 (FIG. 5k) to switch this flip-flop to its ZERO state and is also applied to AND gate 524 (FIG. 5e) which AND gate is conditioned by the output from the ZERO side of flip-flop 520. The output from AND gate 524 is applied through line 525 to the ZERO side input of register B vacancy bit flip-flop 114 (FIG. 5c) to switch this flip-flop to its ZERO state, thus indicating that the processing of the second requested document has been completed and that Register B is ready to receive new information.

The conditions of the vacancy bit flip-flops are now the same as they were after the loading of the first requested document into register A. AND gate 138 (FIG. 5a) is therefore fully conditioned to generate an output signal on line 162 and to apply a signal through differentiator 182 to set primary control flip-flop 180 to its ONE state. This means that line 184 is again energized and line 186 de-energized. The signal on line 136 is also applied through OR gate 126 and line 102 to input request source 100 to cause the initiation of an output cycle from the source. Information as to the fourth requested documents is loaded into register B in a manner already described. When input request source 100 has completed its output cycle for the fourth requested documents, both vacancy bit flip-flops 104 and 114 are in their ONE states, both bin location flip-flops 112 and 122 are in their ZERO states, and the circuit is part-way into the processing of the third requested document. It should be noted that the first film address now stored in flip-flops 118a–118g and the last film address now stored in flip-flops 120a–120g of register B are not the same.

For the requested documents 1 and 2, the bin of origin was the left hand bin and the bin of destination was the right hand bind and the left hand bin, respectively. The processing of requested document number 3 will be described to illustrate the situation where the bin of origin is the right hand bin and the bin of destination the left hand bin. The fourth possible situation, namely that where the bin of origin and the bin of destination are both the right hand bin, will be illustrated with respect to requested document number 4.

Since both vacancy bit flip-flops are in their ONE states and both bin location flip-flops are in their ZERO states, AND gates 234 (FIG. 5e) and 240 are both fully conditioned causing AND gate 242 to be fully conditioned. The output signal from AND gate 242 is applied through line 244 and OR gate 290 (FIG. 5h) to AND gate 300. Since AND gate 300 is fully conditioned by the signal on line 184, it generates an output signal which is passed through normally closed contact 266B to the ONE side input of bin of destination flip-flop 308. This means that document 3 is to be returned to the left hand bin and that BDE-L line 310 will have a signal thereon. The output from AND gate 234 is also applied through line 272 and normally closed contact 266E to AND gate 274 which AND gate is conditioned by the signal on line 184. The output from AND gate 274 is applied to the ZERO side input of bin of origin flip-flop 284, causing an output signal to be generated on BOR-R line 288.

The signal on line 288 is applied as one input to AND gate 338 (FIG. 5h), the other input to this AND gate being from the ZERO side output of flip-flop 340. The output from AND gate 338 is applied to AND gate 354 which is at this time conditioned by the signal on line 184, causing an output signal to be applied through line 370 to condition gates 372 (FIG. 5g). Again, this operation is merely a perfunctory one, since the bin address contained in flip-flops 106a–106f has already been applied to the right bin piston valves 48v and 48h and the right bin compare circuit 386.

Since bin location flip-flop 112 is in its ZERO state, there is no signal on line 275 and therefore inverter 279 (FIG. 5j) applies a signal to AND gate 281. The other input to this AND gate is the signal on line 184. The output from AND gate 281 is applied to condition gate 433 to pass the lens address contained in register A first film address flip-flops 108f–108g to lens piston valves 20 and lens compare circuit 438 (FIG. 5m).

The output from the ZERO side of bin location flip-flop 112 is applied through line 283 to one input of AND gate 406 (FIG. 5j), this AND gate being conditioned by the signal on line 184 at this time. The output from AND gate 406 is applied through OR gate 404 to condition gates 402 and is also applied through OR gate 404, line 411, OR gate 413 (FIG. 5l), and differentiator 414, to the ONE side input of flip-flop 416. The output from the ONE side of flip-flop 416 is applied to film stop air supply valve 33 to cause air to be applied to the film stop valves 30 and 32 (FIG. 1). Gates 400 (FIG. 5j) are conditioned by the signal on line 184 to pass the stop information contained in register A first film address flip-flops 108a–108e to the input of conditioned gates 402. The outputs from gates 402 are applied to left film stop valves 30 and left stop compare circuit 410. It is noticed that since the film strip for requested document 3 is taken from the right bin 12, it is the first film address rather than the last film address flip-flops which determine the front-most stop to be raised.

Assuming that all of the elements have been properly positioned, signals appear on lines 412, 442, and 396. The signals on lines 396 and 412 are applied to fully condition AND gate 398 (FIG. 5k). The output signal from AND gate 398 is applied as one input to AND gate 452 and through OR gate 486 as one input to AND gate 444. The other input to AND gates 452 is derived from the ONE side output of flip-flop 448 which flip-flop was set to its ONE state by the signal on line 184 passing through OR gate 445 and differentiator 446. The output from AND gate 452 is applied through differentiator 456 and OR gate 460 to the ZERO side input of flip-flop 76. The output from the ZERO side of flip-flop 76 causes valve 70 (FIG. 3a) to be energized allowing air to flow through air supply channel 72 and manifold 74 to air nozzles 62 tending to drive a film strip from right to left in transport path 14. The output from differentiator 456 is also applied to 3-way valve 40 to cause air pressure to be momentarily applied to ejector 36.

The film strip containing requested document number 3 is in this way ejected into transport path 14 (FIG. 1) and along transport path 14 to be stopped by the first raised film stop 26. As the film strip passes lens contact 464 (FIG. 5k), an output signal is generated which is applied through differentiator 462 to reset flip-flop 448 to its ZERO state and to one input of AND gates 466 and 468. Since the first film address and the last film address in register A are the same, there is an output signal on line 478 which is applied to fully condition AND gate 474 causing an output signal to be generated through OR gate 470 to the other input of AND gate 466 to one input of AND gate 492. The signal out of AND gate 466 is applied to the ONE side input of flip-flop 340 to switch this flip-flop to its ONE state, causing a signal to appear on line 344.

As has been indicated previously, the signal on line 344 is applied to fully condition AND gate 348 (FIG. 5a) causing a signal to be applied through OR gate 200 to condition gates 202. This allows the contents of register A bin address flip-flops 106a–106f to be applied through gate 202 and through lines 204 and 208 to line selectors 206 and 210, respectively, to properly set the line selectors for the subsequent storing of the bin of destination of the film strip containing requested document number 3.

The signal on line 344 also energizes relay coil 266 (FIG. 5h), thereby opening contacts 266A–266B and transferring contacts 266C–266F. The opening of contacts 266A–266B freezes the contents of bin of destination flip-flop 308 in its ONE state. The transferring of contacts 266C–266F transfers control of bin of origin flip-flop 284 from register A to register B. A signal is now passed from the ZERO side output of register B bin location flip-flop 122 through line 282 and now closed contact 266E to fully conditioned AND gate 274. The output from AND gate 274 is applied to the ZERO side input of bin of origin flip-flop 284 indicating that the bin of origin for the requested documents 4 is the right hand bin.

The signal on line 344 is also applied to AND gates 314 (FIG. 5h) and 336. The other inputs to AND gate 336 is the signal on BOR-R line 288. The output from AND gate 336 is applied as one input to AND gate 316, the other input to this AND gate being the output line 310 from the ONE side of bin of destination flip-flop 308. The output from AND gate 316 is applied through conditioned AND gate 358 and line 380 to condition gates 382 (FIG. 5i). The conditioning of gates 382 allows the bin address of requested documents number 4 stored in bin address flip-flops 116a–116f of register B to be applied to right bin piston valves 48v–48h and right bin compare circuit 386. The positioning of the right bin to eject requested documents number 4 is therefore started while the processing of requested document number 3 is being completed.

The output from AND gate 314 (FIG. 5h) is applied to one input of AND gate 350, the other input of which is the line 184. The output from AND gate 350 is applied through line 366 to condition gate 368 (FIG. 5g). The conditioning of gates 368 allows the bin address for the third requested document stored in register A bin address flip-flops 106a–106f to be applied to left bin piston valves 46v–46h and left bin compare circuit 384. The left bin is in this way positioned to receive the third document when the processing of this document has been completed.

As mentioned previously, the second input to AND gate 468 (FIG. 5k) is derived from the output of AND gate 444 which is at this time fully conditioned by the output from OR gate 486 and the signal on line 442 from lens compare circuit 438. The output from AND gate 468 is applied through differentiator 488 to energize shutter mechanism 22. The energizing of shutter mechanism 22 causes the third requested document to be reproduced on output film 24 and causes the shutter contact to be closed, resulting in an output signal on line 490. The signal on line 490 is applied as the other input to AND gate 492 the output from this AND gate being applied as one input to AND gate 502 (FIG. 5m).

When the left bin 10 has been properly positioned to receive the film strip containing requested document number 3, a signal appears on line 392 which signal is applied as one input to AND gate 320 (FIG. 5m). The other input to this AND gate is BDE-L line 310. The output from this AND gate is applied through OR gate 504 to fully condition AND gate 502. The output from AND gate 502 is applied as one input to AND gate 318, the other input to this AND gate being the BDE-L line 310, and to differentiator 506. The output from AND gate 318 is applied through differentiator 510 and OR gate 460 (FIG. 5k) to the ZERO side input of flip-flop 76. As indicated previously, the switching of flip-flop 76 to its ZERO state causes air to flow in air nozzles 62 (FIG. 3b) of transport path 14. This would, but for the fact that the left hand film stops are still raised and are holding the document in its existing position, tend to drive the film strip containing the third requested document into left hand bin 10.

The output from differentiator 506 is applied to delay 508. A short time later, delay 508 generates an output signal which is applied to end-of-operation-one line 514 and to a second delay 516. The signal on line 514 is applied to the ZERO side input of flip-flop 416 (FIG. 5l) causing this flip-flop to be switched to its ZERO state to de-energized film stop air supply valve 33. This allows the film stops to be returned to their retracted position and allows the film strip containing requested document number 3 to be returned to the left hand bin 10 due to the viscous drag action of the air flowing through air nozzles 62 on the surface of the film strip. The signal on line 514 is also applied through OR gate 220 (FIG. 5e) to trigger bi-directional drivers 194 and 196 and to one input of AND gate 222. Since bin of destination flip-flop 308 is in its ONE state, there is a signal on line 310, causing bi-directional drivers 194 and 196 to generate half-select signals of a polarity to drive a core in magnetic core storage matrix 198 from its ZERO state to its ONE state. The energization of these drivers therefore causes the core in storage matrix 198 corresponding to bin address 24, the bin address for the film strip containing the third requested document to be switched to its ONE state indicating that this film strip is stored in left bin 10. The signal applied to AND gate 222 fully conditons this AND gate, causing it to generate an output signal which switches flip-flop 520 to its ONE state.

A short time later, delay 516 (FIG. 5m) generates an output signal on end-of-operation-two line 518 which is applied to the ZERO side input of flip-flop 340 and to one input of AND gate 522 (FIG. 5e), the other input to this AND gate being the output signal from the ONE side of flip-flop 520. The output signal from AND gate 522 is applied through line 523 to the ZERO side input of register A vacancy bit flip-flop 104 (FIG. 5a). The switching of this flip-flop to its ZERO state indicates that the processing of requested document number 3 has been completed and that register A is now ready to receive information as to another requested document.

At this time, there are signals on lines 124 and 236. The combined occurrence of signals on these lines causes AND gate 128 (FIG. 5a) to be fully conditioned and the signal on line 124 is passed through OR gate 126 and line 102 to energize input request source 100. The output from AND gate 128 is applied through differentiator 178 to switch primary control flip-flop 180 to its ZERO state and is applied through OR gate 144 to energize line 146. The switching of primary control flip-flop 180 to its ZERO state causes line 186 to be energized and line 184 to be de-energized. The energizing of line 146 causes the information as to requested document number 5 to be applied by input request source 100 to register A in a manner previously described. When the output cycle for input request source 100 has been completed, vacancy bit flip-flops 104 and 106 for registers A and B, respectively, are both in their ONE states while register A bin location flip-flop 112 is in its ONE state and register B bin location flip-flop 122 is in its ZERO state.

Referring back to the table at the beginning of this section, it is seen that the requested document 4 is actually three documents on the same film strip. Since the bin of origin for this film strip is the right hand bin, the first document to be read will be the document stored in the lowest numbered address, the document stored in address 14 on the film strip. Referring to FIG. 2, it is seen that documents 14 and 15 are at the same stop position and only a movement of the lens is required to go from one to the other, whereas a movement of both the film strip and the lens is required to get to document 16 from document 15. The manner of accomplishing these operations will now be described. It can be seen that a description of the operation with respect to requested document 4 illustrates both the sequence of operations where more than one document is taken from a single film strip and also the sequence of operations where both the bin of origin and bin of destination are the right hand bin.

With the vacancy bit and bin location flip-flops set as indicated above, AND gates 232 (FIG. 5e) and 240 are both fully conditioned. The outputs from these AND gates are applied to fully condition AND gate 247 causing an output signal on line 248 which is applied through OR gate 298 (FIG. 5h), conditioned AND gate 306, and normally closed contact 266A to set bin of destination flip-flop 308 to its ZERO state. This means that the film strip containing requested documents number 4 will be returned to the right hand bin. Bin of origin flip-flop 284 is set to its ZERO state by the output from the ZERO side of register B bin location flip-flop on line 282 which is applied through normally closed contact 266C, and conditioned AND gate 268 to the ZERO side input of the bin of origin flip-flop.

Since the information as to the bin address for requested documents number 4 has already been supplied to right bin piston valves and right bin compare circuit 48v–48h and 386, respectively, during the processing of requested document number 3, the circuitry for normally applying this information to the right bin piston valve will not be described here. To position the lens and the stops, the signal on line 186 is applied to condition gates 434 (FIG. 5l), to partially condition AND gate 289 and to partially condition AND gate 408 (FIG. 5j). The conditioning of gates 434 allows the stop address contained in register B first film address flip-flops 118a–118e to be passed through gates 434 and cable 435 to gates 402 (FIG. 5j). Since register B bin location flip-flop 122 is in its ZERO state, line 282 has a signal thereon to fully condition AND gate 408. AND gate 408 applies its output signal through OR gate 404 to condition AND gate 402 to pass the stop address applied thereto to left film stops 30 and the left stop compare circuit 410. The output from OR gate 404 is also applied through line 411, OR gate 413 (FIG. 5l), and differentiator 414 to the ONE side input of flip-flop 416. The output from the ONE side of flip-flop 416 is applied to energize film-stop-air-supply valve 33.

Since bin location flip-flop 122 is in its ZERO state, the output line 276 from the ONE side thereof does not have a signal thereon and inverter 287 (FIG. 5l) is therefore effective to apply the second conditioning signal to AND gate 289 to fully condition this gate. The output from this gate is applied to gates 437 allowing these gates to pass the lens address contained in register B first film address flip-flops 118f–118g to lens piston valve 20 and the lens compare circuit 438 (FIG. 5m). When the left stops, the lens piston, and the right bin pistons have all reached the proper positions, output signals appear on lines 396, 412 and 442.

The signals on lines 396 and 412 fully condition AND gate 398 (FIG. 5k) causing it to generate an output signal which is applied as one input to AND gate 452 and through OR gate 486 as one input to AND gate 444. The other input to AND gate 452 is derived from the ONE side output of flip-flop 448 which was previously switched to its ONE state by the signal on line 186 passing through OR gate 445 and differentiator 446. The output from AND gate 452 is applied to differentiator 456. The pulse out of differentiator 456 is applied through OR gate 460 to switch flip-flop 76 to its ZERO state, causing air to flow in air nozzles 62 (FIG. 3a) as previously indicated. The pulse out of differentiator 456 is also applied to valve 40 (FIG. 1) to cause air pressure to be momentarily applied to ejector 36. This causes the film strip containing requested documents 4 to be blasted out of bin 12 into transport path 14 and along transport path 14 until its leading edge strikes the first raised film stop 26. As the film strip passes along the transport path, it trips lens contact 464 (FIG. 5k), causing an output signal to be generated which is applied through differentiator 462 to switch flip-flop 448 to its zero state and is applied as one input to AND gates 466 and 468. Since the addresses in register B first film address flip-flops 118a–118g and last film address flip-flops 120a–120g are different, register B film address compare circuit 484 (FIG. 5f) does not generate an output signal on line 482 and AND gate 466 is therefore not fully conditioned. Flip-flop 340 therefore remains in its ZERO state.

The signal on line 442 out of lens compare circuit 438 (FIG. 5m) is applied to fully condition AND gate 444 (FIG. 5k), causing a signal to be applied to fully condition AND gate 468. The output from AND gate 468 is applied through differentiator 488 to shutter mechanism 22. This causes the first of the requested documents number 4 to be reproduced on output film strip 24 (FIG. 1) and causes a contact in the shutter to be closed to energize line 490. The signal on line 490 is applied as one input to AND gate 492; however, since there is no signal on line 482, this AND gate is not conditioned and there is no output signal therefrom.

The signal on line 490 is also applied as one input to AND gate 500 (FIG. 5m). The other input to this AND gate is derived from AND gate 538 which at this time is fully conditioned by the output signal from AND gate 408 and the output signal from inverter 534. Since line 482 from register B film address compare circuit 484 does not have a signal thereon at this time, inverter 534 is conditioned to generate an output. The output from AND gate 500 is applied through count-up line 540 to gating circuit 542 to cause the address in first film address flip-flops 118a–118f to be incremented one position. The change of address in these flip-flops from 14 to 15, involves only a change in the lens address. This changed lens address is applied through still-conditioned gates 437 (FIG. 5l) to lens piston valves 20 and lens compare circuit 438 (FIG. 5m).

Since the lens address in compare circuit 438 is now different from that shown by lens position indicators 440, the signal on line 442 is dropped, thereby deconditioning AND gate 444. When the lens has moved to the proper position, a signal again appears on line 442 to recondition AND gate 444. AND gate 468 is now fully conditioned and generates an output signal which is passed through differentiator 488 to again energize shutter mechanism 22. This causes the second document of the documents 4 to be reproduced on output film 24 (FIG. 1) and also causes an output signal on line 490 which is again applied to fully condition AND gate 500.

The output from AND gate 500 on line 540 is again applied to gating circuit 542 (FIG. 5f) to cause the address stored in register B first film address flip-flops 118a–118g to be incremented. This causes both the lens address and the stop address contained in this register to be changed. The new lens address is applied through still conditioned gates 437 to lens piston valve 20 and lens compare circuit 438. Since, as before, the signal applied to lens compare circuit 438 by lens position indicator 440 is different from that stored in the lens compare circuit the signal on line 442 is dropped causing AND gates 444 and 468 to be deconditioned.

The new stop address is passed through still conditioned gates 434 (FIG. 5l) and 402 (FIG. 5j) to left film stop valves 30 and left film stop compare circuit 410. This causes the front-most film stop to be dropped and, since the position indicated, by the stop position indicator 90 is different from that indicated in left stop compare circuit 410, the signal on line 412 is dropped deconditioning AND gate 398 and 452. The dropping of this signal does not, however, effect the operation of the circuit. The viscous drag effect of the air flowing through air nozzles 62 on the surface of the film advances the film strip up against the now-forward film stop. The film is in this way repositioned to read the next requested document.

When the lens has also been properly positioned, a signal reappears on line 442 to recondition AND gates 444 (FIG. 5k) and 468. This causes differentiator 488 to apply a pulse to shutter mechanism 22, causing the last of the requested documents number 4 to be reproduced on output film strip 24 and causing a signal to be applied to line 490. Since the addresses stored in register B first film address flip-flops 118a–118g and the register B last film address flip-flops 120a–120g are now the same, there is an output signal on line 482 which is applied to inverter 534 to inhibit further operation of the count-up count-down circuitry formed by for example, AND gates 538 and 500. The signal on line 482 is applied through conditioned AND gate 476 and OR gate 470 to condition AND gates 466 and 492.

AND gate 466 is now fully conditioned, causing an output signal to be applied to switch flip-flop 340 to its ONE state. The resulting output signal on line 344 is applied through conditioned AND gate 346 (FIG. 5c) and OR gate 212 to gates 214 causing the bin address contained in register B bin address flip-flops 116c–116f to be applied through lines 216 and 218 to line selectors 206 and 210, respectively. The signal on line 344 also energized coil 266 (FIG. 5h) to set the contents of bin of destination flip-flop 308 preventing further change thereof and to transfer control of the bin of origin flip-flop 284 from register B to register A. The output signal from AND gate 232 (FIG. 5e) on line 264 is applied through now closed contact 266D (FIG. 5h) and conditioned AND gate 278 to switch bin of origin flip-flop 284 to its ONE state.

Finally, the signal on line 344 is applied to AND gates 322 (FIG. 5h) and 332. AND gate 322 is fully conditioned by the output signal on BDE-R line 312 while AND gate 332 is fully conditioned by the output on BOR-L line 286. The output from AND gate 322 is applied through conditioned AND gate 356 and line 380 to condition gates 382 (FIG. 5i). Gates 382 pass the contents of register B bin address flip-flops 116a–116f to right hand bin piston valves 48h–48v and right bin compare circuit 386. Since the film strip containing requested document 4 was originally ejected from right bin 12, this bin should be properly positioned at this time and the above described operation would in all likelihood be a perfunctory one, but, should the bin for some reason have drifted, it does provide an extra measure of reliability. The output from AND gate 332 is applied as one input to AND gate 324, the other input to this AND gate being derived from the BDE-R line 312. The output from AND gate 324 is applied to conditioned AND gate 364 causing an output signal on line 366 which is applied to conditioned gates 368 (FIG. 5g) to pass the bin address for the film strip containing requested document number 5 from register A bin address flip-flops 106a–106f to left bin piston valves 46h–46v and left bin compare circuit 384.

The signal applied by shutter mechanism 22 (FIG. 5k) to AND gate 492 now finds this gate conditioned and is applied therethrough to one input of AND gate 502 (FIG. 5m). When the right bin has been properly positioned to receive the film strip containing requested documents number 4, a signal appears on line 396 which signal is applied to one input of AND gate 330. The other input to this AND gate is the BDE-R line 312. The output from AND gate 330 is applied through OR gate 504 to fully condition AND gate 502. The output from AND gate 502 is applied as one input to AND gate 328 and to the input of differentiator 506. Since AND gate 328 is fully conditioned at this time by the signal on BDE-R line 312, it generates an output signal which is applied through differentiator 512 and OR gate 458 (FIG. 5k) to the ONE side input of flip-flop 76. As indicated previously, this causes air to flow in nozzles 60 (see FIG. 3a) of transport path 14. The viscous drag effect of the air flowing from nozzles 60 on the surface of the film strip drives this film strip through transport path 14 to the proper bin position in right bin 12.

The output from differentiator 506 (FIG. 5m) is applied to delay 508. A short time later, delay 508 applies an output signal to end-of-operation-one line 514 and to delay 516. The signal on end-of-operation-one line 514 is applied to the ZERO side input of flip-flop 416 (FIG. 5l) to reset this flip-flop to its ZERO state. The resetting of flip-flop 416 de-energizes film stop air supply valve 33 allowing all of the film stops to return to their retracted position. The signal on line 514 is also applied through OR gate 220 (FIG. 5e) to condition AND gate 224 and to trigger bi-directional drivers 194 and 196. Since bin of destination flip-flop 308 is in its ZERO state, line 310 does not have a signal thereon at this time and the signal applied by bi-directional drivers 194 and 196 to magnetic core storage matrix 198 is of a polarity tending to switch a core from its ONE state to its ZERO state. The core corresponding to the bin location in which the film strip containing documents number 4, bin position 19, is stored, is therefore left in its ZERO state, indicating that this film strip is stored in right bin 12.

AND gate 224 (FIG. 5e) is fully conditioned at this time by the signal applied to it by line 186, causing an output signal to be applied to the ZERO side input of flip-flop 520. This causes flip-flop 520 to be switched to its ZERO state.

A short time later, delay 516 (FIG. 5m) applies an output signal to end-of-operation-two line to 518 which signal is applied to switch flip-flop 340 (FIG. 5k) to its ZERO state and is applied as one input to AND gate 524 (FIG. 5e), the other input this AND gate being the output from the ZERO side of flip-flop 520. The output signal from AND gate 524 is applied to the ZERO side input of register B vacancy bit flip-flop 114 (FIG. 5e) to switch this flip-flop to its ZERO state.

The above illustrative example illustrates the various operations which can be performed by the device of this invention. The speed of the operation of the circuit could be increased still further by modifying the circuit so that the new film strip is ejected at the same time that the utilized film strip is returned to its bin. However, to accomplish this, the timing of the raising and lowering of the film stops would become quite critical and the control circuitry would accordingly become more complex.

While the invention has been particularly shown and described with reference to a preferred embodiment thereof, it will be understood by those skilled in the art that the foregoing and other changes in form and details may be made therein without departing from the spirit and scope of the invention.

What is claimed is:
1. A record retrieval system comprising:
 a utilization station;
 a first and a second bin, each having a plurality of record receiving positions and both bins having a position corresponding to each record;
 means for indicating in which bin a requested record is stored;
 means for indicating in which record receiving position of the indicated bin a requested record is stored;
 means operable for moving a selected record from a bin to said utilization station;
 positioning means operable in response to the indications in said bin indicating means and said record receiving position indicating means for positioning the indicated bin relative to said record moving means;
 means operable when said bin is properly positioned for actuating said record moving means;
 means operable after said actuating means for causing information as to the next requested record to be applied to said bin indicating means;
 said positoning means being operable in response to the new indication in said bin indicating means and the indication in said position indicating means for causing the bin not indicated by said bin indicating means to be positioned to receive the first requested record;
 and means for actuating said record moving means to move said first requested record to said last mentioned bin.

2. A record retrieval system comprising:
 a utilization station;
 a first and a second bin, each having a plurality of record receiving positions and both bins having a position corresponding to each record;
 means for indicating in which bin a requested record is stored;
 means for indicating in which record receiving position of a bin a requested record is stored;
 means operable for moving a selected record from a bin to said utilization station;
 positioning means operable in response to the indications in said bin indicating means and said record receiving position indicating means for positioning the indicated bin relative to said record moving means;
 means operable when said bin is properly positioned for actuating said record moving means;
 means operable after said actuating means for causing information as to the next requested record to be applied to said bin indicating means and said record receiving position indicating means;
 said bin positioning means being operable in response to the new indication in said bin indicating means and the new indication in said positon indicating means for positioning the indicated bin relative to said record moving means and being operable in response to the new indication in said bin indicating means and the old indication in said position indicating means for positioning the other bin to receive the first requested record;
 and means for actuating said record moving means to move said first requested record to said other bin.

3. A record retrieval system comprising:
 a utilization station;
 a first and a second bin, each having a plurality of record receiving positions and both bins having a position corresponding to each record, said bins being positioned on opposite sides of said utilization station;
 means for indicating in which bin a requested record is stored;
 means for indicating in which record receiving position of the indicated bin a requested record is stored;
 transport means connecting each of said bins to said utilization station;
 means operable for driving a selected record from a bin through said transport means to said utilization station;
 positioning means operable in response to the indications in said bin indicating means and said record receiving position indicating means for positioning the indicated bin relative to said transport means;
 means operable when said bin is properly positioned for actuating said driving means;
 means operable after said actuating means for causing information as to the next requested record to be applied to said bin indicating means;
 said bin positioning means being operable in response to the new indication in said bin indicating means and the new indication in said position indicating means for postioning the indicated bin relative to said record moving means and being operable in response to the new indication in said bin indicating means and the old indication in said position indicating means for positioning the other bin to receive the first requested record;
 and means for actuating said driving means to move said first requested record to said other bin.

4. A system for retrieving requested documents stored on record members, each record member containing a plurality of documents, comprising:
 a first and second bin, each having a plurality of record receiving positions and both bins having a position corresponding to each record;
 means for indicating in which bin a record containing a requested document is stored;
 means for indicating in which record receiving position of the indicated bin said document-containing record is stored;
 means operable for moving a selected record from a bin to said utilization station;
 positioning means operable in response to the indication in said bin indicating means and said record receiving position indicating means for positioning the indicated bin relative to said record moving means;
means operable when said bin is properly positioned for actuating said record moving means;
means for indicating the relative position of a requested document on said record member;
means responsive to said document position indicating means for positioning said document-containing record member and said utilization station with said requested document at the utilization station;
means operable after said actuating means for causing information as to the requested document to be applied to said bin indicating means;
said positioning means being operable in response to the new indication in said bin indicating means and the indication in said position indicating means for causing the bin not indicated by said bin indicating means to be positioned to receive the record containing the first requested document;
and means for actuating said record moving means to move said record to said last mentioned bin.

5. A system for retrieving a record strip comprising:
a first and a second bin each having a plurality of record receiving positions and both bins having a position corresponding to each record;
means for indicating in which receiving position a desired record is stored;
means for indicating in which bin a desired record is stored;
a record utilization means;
a first transport path connecting said first bin to said utilization means;
a second transport path connecting said second bin to said utilization means;
means operable in response to the indications in said receiving position indicating means and said bin indicating means for positioning the indicated bin with the indicated record position in line with the associated transport path;
means for driving the record to be utilized from the indicated record receiving position, through the associated transport path to said utilization means;
means operable in response to the indication in said receiving position indicating means for the record being utilized and the indication in said bin indicating means for the next record to be utilized for causing the bin not indicated by said bin indicating means to be positioned with the indicated record receiving position in line with its associated transport path;
and means for driving the utilized record from the utilization station through said last-mentioned transport path to the indicated record receiving position.

6. A system for retrieving a record strip comprising:
a first and a second bin each having a plurality of record receiving positions and both bins having a position corresponding to each record strip;
means for indicating in which receiving position a desired record is stored;
means for indicating in which bin a desired record is stored;
a record utilization means;
a first transport path connecting said first bin to said utilization means;
a second transport path connecting said second bin to said utilization means;
means operable in response to the indications in said receiving position indicating means and said bin indicating means for aligning the indicated record receiving position with the associated transport path;
means for driving the record to be utilized from the indicated record receiving position, through the associated transport path to said utilization means;
means operable in response to the indication in said receiving position indicating means for the record being utilized and the indication in said bin indicating means for the next record to be utilized for causing the bin not indicated by said bin indicating means to be positioned with the indicated record receiving position in line with its associated transport path;
means operable in response to the indication in said receiving position indicating means and said bin indicating means for the next record to be utilized for causing the bin indicated by said bin indicating means to be positioned with the indicated record receiving position in line with its associated transport path;
and means for driving the utilized record from the utilization station through said last-mentioned transport path to the indicated record receiving position;
said record driving means now being effective to drive the next record to be utilized from its indicated record receiving position through the associated transport path to said utilization means.

7. A system for retrieving a desired document stored as one of a plurality of documents arranged in a matrix array of rows and columns on a record strip comprising:
a first and a second bin each having a plurality of record receiving positions and both bins having a position corresponding to each record;
document indicating means for indicating the row and the column in which a desired document is stored;
means for indicating in which receiving position a desired record is stored;
means for indicating in which bin a desired record is stored;
a record utilization means;
a first transport path connecting said first bin to said utilization means;
a second transport path connecting said second bin to said utilization means;
means operable in response to the indications in said receiving position indicating means and said bin indicating means for a record to be utilized for causing the indicated bin to be positioned with the indicated record position in line with the associated transport path;
means for driving the record to be utilized from the indicated record receiving position, through the associated transport path to said utilization means;
means operable in response to the row indication in said document indicating means for the record to be utilized for causing said record to be stopped with the row of the strip containing the desired document at the utilization means;
means operable in response to the column indication in said document indicating means for causing said utilization means and said record to be relatively positioned with said utilization means in line with the column of the strip containing the desired document;
means operable in response to the indication in said receiving position indicating means for the record being utilized and the indication in said bin indicating means for the next record to be utilized for causing the bin not indicated by said bin indicating means to be positioned with the indicated receiving position in line with its associated transport path;
and means for driving the utilized record from the utilization station through said last-mentioned transport path to the indicated record receiving position.

No references cited.

UNITED STATES PATENT OFFICE
CERTIFICATE OF CORRECTION

Patent No. 3,158,287                                         November 24, 1964

Richard K. Wilmer

It is hereby certified that error appears in the above numbered patent requiring correction and that the said Letters Patent should read as corrected below.

Column 6, line 47, for "present" read -- prevent --; column 7, line 41, for "top" read -- stop --; column 11, line 38, after "(b)" insert -- through normally-closed contact 266D to form one input --; line 39, strike out "put"; column 12, line 24, for "there" read -- these --; column 13, line 6, for "in" read -- bin --; line 7, for "337" read -- 377 --; column 19, line 63, for "338" read -- 388 --; column 21, line 24, for "in" read -- to --; line 72, for "24" read -- 14 --; column 22, line 51, for "an" read -- and --; column 23, line 46, for "196" read -- 186 --; column 25, line 46, for "thorugh" read -- through --; column 33, line 17, after "input" insert -- to --.

Signed and sealed this 27th day of July 1965.

(SEAL)
Attest:

ERNEST W. SWIDER                                  EDWARD J. BRENNER
Attesting Officer                                Commissioner of Patents